(12) United States Patent
Jung et al.

(10) Patent No.: US 12,358,446 B2
(45) Date of Patent: Jul. 15, 2025

(54) JUDDER IDENTIFICATION DEVICE AND VEHICLE HAVING THE SAME

(71) Applicants: Hyundai Motor Company, Seoul (KR); Kia Corporation, Seoul (KR)

(72) Inventors: Jang Hyun Jung, Hwaseong-si (KR); Myungki Yeom, Incheon (KR); Hyundong Her, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 290 days.

(21) Appl. No.: 18/200,435

(22) Filed: May 22, 2023

(65) Prior Publication Data

US 2024/0116466 A1 Apr. 11, 2024

(30) Foreign Application Priority Data

Oct. 7, 2022 (KR) .......................... 10-2022-0128471

(51) Int. Cl.
*B60R 16/023* (2006.01)

(52) U.S. Cl.
CPC .............................. *B60R 16/0232* (2013.01)

(58) Field of Classification Search
CPC . B60R 16/0232; B60T 17/22; B60T 2230/04; B60T 2250/04; G06N 3/08; G06N 20/00; F16D 65/0006; F16D 65/0012; F16D 65/0018
See application file for complete search history.

(56) References Cited

U.S. PATENT DOCUMENTS

| | | | | |
|---|---|---|---|---|
| 10,962,070 | B2* | 3/2021 | Ketteler | F16D 65/127 |
| 11,782,451 | B1* | 10/2023 | Venkatraman | G05D 1/0221 |
| | | | | 701/26 |
| 2004/0084261 | A1* | 5/2004 | Burgoon | F16D 65/0006 |
| | | | | 188/218 XL |
| 2007/0034457 | A1* | 2/2007 | Kim | F16D 49/16 |
| | | | | 188/29 |
| 2021/0213927 | A1* | 7/2021 | Kim | F16D 65/0006 |
| 2023/0061412 | A1* | 3/2023 | Joo | B60W 50/16 |
| 2023/0334435 | A1* | 10/2023 | Subramanian | B60T 17/22 |
| 2023/0415715 | A1* | 12/2023 | Sharlow | B60T 8/172 |
| 2024/0217500 | A1* | 7/2024 | Cha | B60T 17/221 |
| 2024/0239312 | A1* | 7/2024 | Ito | B60T 8/172 |

\* cited by examiner

*Primary Examiner* — Curtis J King
(74) *Attorney, Agent, or Firm* — Morgan, Lewis & Bockius LLP

(57) ABSTRACT

A vehicle including a judder identification device includes a first sensor group including a plurality of sensors; a second sensor group including a plurality of sensors different from the plurality of sensors of the first sensor group; a processor configured to predict a judder intensity based on information detected by the plurality of sensors of the first sensor group, predict a judder position based on the information detected by the plurality of sensors of the first sensor group and information detected by the plurality of sensors of the second sensor group, and identify a judder position and a judder intensity based on the predicted judder intensity, a preset judder intensity, the predicted judder position, and a preset judder position; and an outputter configured to output the identified judder position and the identified judder intensity.

20 Claims, 18 Drawing Sheets

FIG. 6

| JUDDER INTENSITY LEVEL (VALUE FOR EACH LEVEL) | JUDDER POSITION LEVEL (VALUE FOR EACH LEVEL) |
|---|---|
| FIRST LEVEL (8: NO JUDDER) | FIRST LEVEL (FL:X ,FR:X) |
| SECOND LEVEL (7+: SIGNIFICANTLY WEAK JUDDER) | SECOND LEVEL (FL:X ,FR:○) |
| THIRD LEVEL (7: WEAK JUDDER) | THIRD LEVEL (FL:○ ,FR:X) |
| FOURTH LEVEL (7- : MEDIUM JUDDER) | FOURTH LEVEL (FL:○ ,FR:○) |
| FIFTH LEVEL (6: STRONG JUDDER, +6: SIGNIFICANTLY STRONG JUDDER) | FIFTH LEVEL (NO DETERMINATION ON JUDDER: NON-BRAKING STATE) |
| SIXTH LEVEL (NO DETERMINATION ON JUDDER: NON-BRAKING STATE) | |

FIG. 9

| | | | | | |
|---|---|---|---|---|---|
| INTENSITY PREDICTION INPUT | (Batch_size,20,19) | | | | |

| time / INPUT FACTOR | swaIn_norm | axIn_norm | ... | BIs_ohe_1 | |
|---|---|---|---|---|---|
| 0.01SEC | | | | | FIRST BATCH |
| 0.02SEC | | | | | |
| ... | | | | | 20 |
| 0.19SEC | | | | | |
| 0.20SEC | | | | | 20 |
| ... | | | | | SECOND BATCH |

19 (columns)

Conv1D(filter:32,16,8)
Batch_Normalization
MaxPooling1D
Dropout

FIG. 15

Dense(Softmiat)

| JUDDER INTENSITY LEVEL (VALUE FOR EACH LEVEL) | EXAMPLE OF CORRECT ANSWER EXPRESSION OF AI |
|---|---|
| FIRST LEVEL (8: NO JUDDER) | 0 0 0 0 0 1 |
| SECOND LEVEL (7+: SIGNIFICANTLY WEAK JUDDER) | 0 0 0 0 1 0 |
| THIRD LEVEL (7: WEAK JUDDER) | 0 0 0 1 0 0 |
| FOURTH LEVEL (7-: MEDIUM JUDDER) | 0 0 1 0 0 0 |
| FIFTH LEVEL (6: STRONG JUDDER, +6: SIGNIFICANTLY STRONG JUDDER) | 0 1 0 0 0 0 |
| SIXTH LEVEL (NO DETERMINATION ON JUDDER: NON-BRAKING STATE) | 1 0 0 0 0 0 |

JUDDER IDENTIFICATION DEVICE AND VEHICLE HAVING THE SAME

CROSS-REFERENCE TO RELATED APPLICATION

The present application claims priority to Korean Patent Application No. 10-2022-0128471, filed on Oct. 7, 2022, the entire contents of which is incorporated herein for all purposes by this reference.

BACKGROUND OF THE PRESENT DISCLOSURE

Field of the Present Disclosure

The present disclosure relates to a judder identification device that identifies a judder phenomenon generating vibration and noise through a steering wheel and a suspension device during braking, and a vehicle having the same.

Description of Related Art

When excessive heat is generated due to repetitive use of brakes, deformation of a disc or brake pad may occur, or a surface of the disc may become irregular. Accordingly, friction between the brake pad and the disc becomes irregular and a slip-stick phenomenon occurs, causing a judder phenomenon.

That is, when a driver operates a brake pedal at medium or high speed, judder occurs, that is, a cluster, a steering wheel, and a suspension device vibrate, or sometimes an entire chassis vibrates, and then, pulsation of the same period of as the wheel rotation speed is transferred from the brake pedal to a user's foot.

Given a significant leap in vehicle performance and users' increasing demand for quietness and comfort while driving, judder during braking reduces a vehicle's commercial value. In particular, judder occurring due to braking while driving at a high speed of 120 kph or higher causes anxiety to users and hinders quietness and comfort of the vehicle.

Recently, dynamics-based judder identification logic has been developed and applied. However, because judder identification may not be performed for each wheel, all front wheels are required to be replaced when judder is identified, leading to an increase in replacement cost of wheels and user dissatisfaction.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a judder identification device which may identify a position of a wheel where judder occurs during braking and an intensity of judder, and a vehicle having the same.

Additional aspects of the present disclosure will be set forth in part in the description which follows, and in part, will be obvious from the description, or may be learned by practice of the present disclosure.

According to an aspect of the present disclosure, there is provided a judder identification device including: a communication device configured to communicate with a first sensor group and a second sensor group; a first processor configured to predict a judder intensity based on information detected by a plurality of sensors of the first sensor group; a second processor configured to predict a judder position based on the information detected by the plurality of sensors of the first sensor group and information detected by a plurality of sensors of the second sensor group; and a third processor configured to identify a judder position and a judder intensity based on the judder intensity predicted by the first processor, a preset judder intensity, the judder position predicted by the second processor, and a preset judder position.

According to an aspect of the present disclosure, the information detected by the plurality of sensors of the first sensor group includes steering angle information of a steering angle sensor, longitudinal acceleration information of a longitudinal acceleration sensor, lateral acceleration information of a lateral acceleration sensor, yaw rate information of a yaw rate sensor, pressure information of a master cylinder pressure sensor, input torque information of a steering input torque sensor, output torque information of a steering output torque sensor, opening amount information of a throttle position sensor, first wheel speed information of a first wheel speed sensor configured for detecting a wheel speed of a front left wheel, second wheel speed information of a second wheel speed sensor configured for detecting a wheel speed of a front right wheel, and pedal force information of a brake pedal from a brake pressure sensor.

According to an aspect of the present disclosure, the judder identification device further includes a high pass filter configured to pass a preset high-frequency signal among signals of a portion of sensors of the plurality of sensors of the first sensor group, and a low pass filter configured to pass a preset low-frequency signal among signals of other sensors of the plurality of sensors of the first sensor group. According to an aspect of the present disclosure, when predicting the judder intensity, the first processor is configured to: recognize first filtering information including a signal passing through the high pass filter, recognize second filtering information including a signal passing through the low pass filter, and predict the judder intensity based on the first filtering information and the second filtering information.

According to an aspect of the present disclosure, the signals of the portion of sensors of the plurality of sensors of the first sensor group include a signal from the steering input torque sensor and signals from the first wheel speed sensor and the second wheel speed sensor, and the signals of the other sensors of the plurality of sensors of the first sensor group include a signal from the lateral acceleration sensor, a signal from the yaw rate sensor, and a signal from the master cylinder pressure sensor.

According to an aspect of the present disclosure, the first processor is configured to receive turn ON/OFF information from a brake switch turned on or off in response to a pedal force detected by the brake pressure sensor.

According to an aspect of the present disclosure, the judder identification device further includes a high pass filter configured to pass a preset high-frequency signal among signals of a third wheel speed sensor configured for detecting a wheel speed of a rear left wheel, and a preset high-frequency signal among signals of a fourth wheel speed sensor configured for detecting a wheel speed of a rear right wheel. The third wheel speed sensor and the fourth wheel speed sensor belong to the second sensor group. According to an aspect of the present disclosure, when predicting the judder position, the second processor is configured to: recognize third filtering information of the third wheel speed sensor and fourth filtering information of the fourth wheel speed sensor based on the signal passing through the high pass filter, and predict the judder position based on the recognized third filtering information and the recognized fourth filtering information.

According to an aspect of the present disclosure, the first processor is configured to recognize driving speed information based on at least one piece of information of first wheel speed information detected by a first wheel speed sensor, second wheel speed information detected by a second wheel speed sensor, or longitudinal acceleration information detected by a longitudinal acceleration sensor.

According to an aspect of the present disclosure, the first processor is configured to transmit the predicted judder intensity to the second processor.

According to an aspect of the present disclosure, the first processor includes a first artificial intelligence (AI) model performing convolutional neural network (CNN)-based deep learning. According to an aspect of the present disclosure, the second processor includes a second AI model performing the CNN-based deep learning.

According to an aspect of the present disclosure, the first AI model is configured to perform filter normalization, max-pooling, and dropout through the CNN-based deep learning, and predict one of six judder intensity levels using a soft max function, and the second AI model is configured to perform filter normalization, max-pooling, and dropout through the CNN-based deep learning, and predict one of five judder position levels.

According to another aspect of the present disclosure, there is provided a vehicle including: a first sensor group including a plurality of sensors; a second sensor group including a plurality of sensors different from the plurality of sensors of the first sensor group; a processor configured to predict a judder intensity based on information detected by the plurality of sensors of the first sensor group, predict a judder position based on the information detected by the plurality of sensors of the first sensor group and information detected by the plurality of sensors of the second sensor group, and identify a judder position and a judder intensity based on the predicted judder intensity, a preset judder intensity, the predicted judder position, and a preset judder position; and an outputter configured to output the identified judder position and the identified judder intensity.

According to another aspect of the present disclosure, the plurality of sensors of the first sensor group include a steering angle sensor, a longitudinal acceleration sensor, a lateral acceleration sensor, a yaw rate sensor, a master cylinder pressure sensor, a steering input torque sensor, a steering output torque sensor, a throttle position sensor, a first wheel speed sensor configured for detecting a wheel speed of a front left wheel, a second wheel speed sensor configured for detecting a wheel speed of a front right wheel, and a brake pressure sensor configured for detecting a pedal force applied to a brake pedal.

According to another aspect of the present disclosure, the vehicle further includes a high pass filter configured to pass a preset high-frequency signal among signals of a portion of sensors of the plurality of sensors of the first sensor group; and a low pass filter configured to pass a preset low-frequency signal among signals of other sensors of the plurality of sensors of the first sensor group. According to another aspect of the present disclosure, when predicting the judder intensity, the processor is configured to: recognize first filtering information including a signal passing through the high pass filter, recognize second filtering information including a signal passing through the low pass filter, and predict the judder intensity based on the first filtering information and the second filtering information.

According to another aspect of the present disclosure, the signals of the portion of sensors of the plurality of sensors of the first sensor group include a signal from the steering input torque sensor and signals from the first wheel speed sensor and the second wheel speed sensor, and the signals of the other sensors of the plurality of sensors of the first sensor group include a signal from the lateral acceleration sensor, a signal from the yaw rate sensor, and a signal from the master cylinder pressure sensor.

According to another aspect of the present disclosure, the vehicle further includes a brake switch configured to turn on or off a brake lamp. According to another aspect of the present disclosure, the processor is configured to turn on or off the brake switch based on the pedal force detected by the brake pressure sensor.

According to another aspect of the present disclosure, the plurality of sensors of the second sensor group include a third wheel speed sensor configured for detecting a wheel speed of a rear left wheel and a fourth wheel speed sensor configured for detecting a wheel speed of a rear right wheel. According to another aspect of the present disclosure, the vehicle further includes a high pass filter configured to pass a preset high-frequency signal among signals of the third wheel speed sensor and a preset high-frequency signal among signals of the fourth wheel speed sensor.

According to another aspect of the present disclosure, when predicting the judder position, the processor is configured to recognize third filtering information of the third wheel speed sensor and fourth filtering information of the fourth wheel speed sensor based on the signal passing through the high pass filter, and predict the judder position based on the recognized third filtering information and the recognized fourth filtering information.

According to another aspect of the present disclosure, the processor is configured to predict the judder position based on the predicted judder intensity and the information detected by the plurality of sensors of the second sensor group.

According to another aspect of the present disclosure, when predicting the judder intensity, the processor is configured to recognize driving speed information based on at least one piece of information of first wheel speed information detected by a first wheel speed sensor, second wheel speed information detected by a second wheel speed sensor, or longitudinal acceleration information of a longitudinal acceleration sensor, and predict the judder intensity based on the recognized driving speed information.

According to another aspect of the present disclosure, the processor includes a first AI model configured to predict the judder intensity by performing CNN-based deep learning, and a second AI model configured to predict the judder position by performing the CNN-based deep learning.

According to another aspect of the present disclosure, the processor is configured to: obtain an intensity training error based on a difference between the predicted judder intensity and the preset judder intensity, obtain a position training error based on a difference between the predicted judder position and the preset judder position, obtain a total training error based on the intensity training error, the position training error, and a human tuning value, and update the first AI model and the second AI model to minimize the obtained total training error.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 6 is a diagram illustrating an example of dividing judder intensity levels for predicting a judder intensity and judder position levels for predicting a judder position;

FIG. 8, FIG. 9, FIG. 10, FIG. 11, FIG. 12, FIG. 13, FIG. 14 and FIG. 15 are diagrams illustrating examples of an artificial intelligence model performing CNN-based deep learning in a judder identification device according to an exemplary embodiment of the present disclosure.

Figure 1:
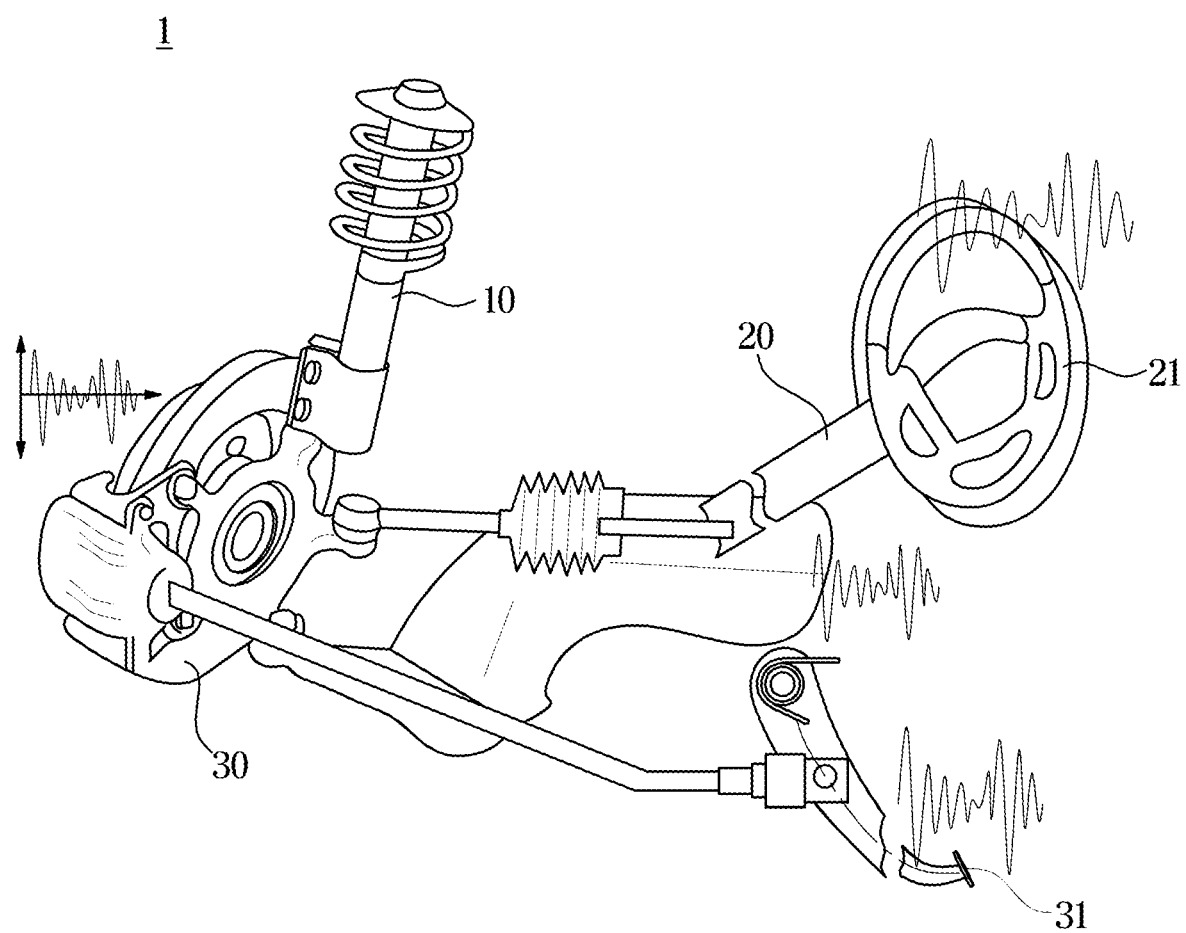
FIG. 1 is a diagram illustrating an example of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Like reference numerals throughout the specification denote like elements. Also, the present specification does not describe all the elements according to various exemplary embodiments of the present disclosure, and descriptions well-known in the art to which the present disclosure pertains or overlapped portions are omitted. The terms such as "part", "—member", "—module", "—device", and the like may refer to at least one process processed by at least one hardware or software. According to various exemplary embodiments of the present disclosure, a plurality of "—parts", "—members", "—modules", "—devices" may be embodied as a single element, or a single of a "part", "—member", "module", "—device" may include a plurality of elements.

It will be understood that when an element is referred to as being "connected" to another element, it may be directly or indirectly connected to the other element, wherein the indirect connection includes "connection" via a wireless communication network.

It will be understood that the term "include" when used in the present specification, specifies the presence of stated features, integers, steps, operations, elements, and/or components, but does not preclude the presence or addition of at least one other features, integers, steps, operations, elements, components, and/or groups thereof.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

FIG. 1 is a diagram illustrating an example of a vehicle according to an exemplary embodiment of the present disclosure.

A vehicle 1 includes a vehicle body including an exterior and an interior, and a chassis where mechanical devices for driving are mounted as a remaining portion except for the vehicle body.

The exterior of the vehicle body includes a front panel, a bonnet, a roof panel, a rear panel, a plurality of doors, a plurality of window glasses provided to each of the doors, and a tailgate for opening and closing a trunk forming a space for storing cargo.

The interior of the vehicle body includes a seat provided for an occupant to sit on, a dashboard, a cluster, a center fascia on which an air vent of air conditioner, etc., is disposed, and a head unit. Here, the cluster is provided on the dashboard and includes a tachometer, speedometer, coolant thermometer, fuel gauge, turn indicator, high beam indicator, warning light, seat belt warning light, odometer, shift lever indicator, door open warning light, engine oil warning light, low oil warning light, etc.

The head unit may be provided with an inputter for receiving an operation command for a variety of functions, and a display for displaying information related to functions being performed in the vehicle and information input by a user.

The vehicle 1 further includes a shift lever provided on the center fascia and receiving an operation position, and a parking switch (also referred to as an electronic parking brake (EPB) button) located around the shift lever or on the head unit and receiving an operation command of the EPB.

The chassis of the vehicle 1 is a frame for supporting the vehicle body.

The chassis of the vehicle 1 may be provided with a plurality of wheels provided on front, rear, left and right sides of the vehicle, a power generation device configured for generating driving force required for driving and adjusting the generated driving force, a power transmission device configured for receiving the generated power and transmitting to the wheels, a suspension device 10 configured for preventing shock from road surface from being transmitted to the vehicle while driving, a steering device 20 configured for adjusting a driving direction of the vehicle, and a brake device 30 configured for performing braking.

The power generation device is provided inside the vehicle, and may include an accelerator pedal, depressed by the user according to a user's acceleration intention, and a throttle position sensor configured for detecting an opening amount of a throttle valve in response to the accelerator pedal depressed. The power generation device may inject an amount of fuel corresponding to the opening amount of the throttle valve.

The suspension device 10 lowers a damping force of a damper when a road surface is irregular, and increases the damping force of the damper when the road surface is regular.

The suspension device 10 increases the damping force of the damper when a driving speed is high, and lowers the damping force of the damper when a driving speed is low. The suspension device 10 increases the damping force of the damper on a curved road, and lowers the damping force of the damper on a straight road. During understeer in which front wheels are not properly operated when cornering, the suspension device 10 lowers a damping force of a front damper, and increases a damping force of a rear damper. During oversteer, the suspension device 10 increases the damping force of the front damper and lowers the damping force of the rear damper.

When driving slowly on an unpaved road with an irregular road surface, the suspension device 10 increases the damping force very strongly. However, when a road surface is slightly irregular, but requires to pass rapidly, the suspension device 10 sets a slightly strong damping force.

When a load increases due to people or cargo, the suspension device 10 increases the damping force, and when a load decreases, lowers the damping force. When the damping force of the damper is increased, the user may have a firm feeling, and when the damping force of the damper is decreased, the user may have a smooth feeling.

The suspension device 10 may include a chassis spring alleviating shock from road surface, and a shock absorber damping and controlling free vibrations of the chassis spring to improve ride comfort. Here, the shock absorber may be a shock absorber of an air suspension device.

The steering device 20 may be divided into a hydraulic steering device configured for generating a steering force using hydraulic pressure, and an electric steering device (i.e., motor driven power steering (MDPS)) configured for using a steering motor as power source for steering assistance.

The electric steering device may be operated by a column assist type (C-EPS) configured for generating a steering force by driving a motor provided in a column, and a rack assist type (R-EPS) configured for generating a steering force by driving a motor provided in a rack The steering device 20 is provided inside the vehicle, and may include a steering wheel 21 rotated by the user according to a user's steering intention.

The steering device 20 may include a steering angle sensor configured for detecting a steering angle of the steering wheel 21, a first torque sensor configured for detecting an input torque of a steering motor, and a second torque sensor configured for detecting an output torque of the steering motor.

The brake device 30 is provided inside the vehicle and may include a brake pedal 31 depressed by the user according to a user's braking intention.

The brake device 30 may further include an electronic brake control unit of controlling the brake device in response to a driver's braking intention through the brake pedal 31 and/or in response to wheel slip.

The brake device 30 may be classified into a disc brake, a drum brake, an engine brake, a regenerative brake, and an exhaust brake. In the exemplary embodiment of the present disclosure, a disc brake is described as an example.

Figure 2A:
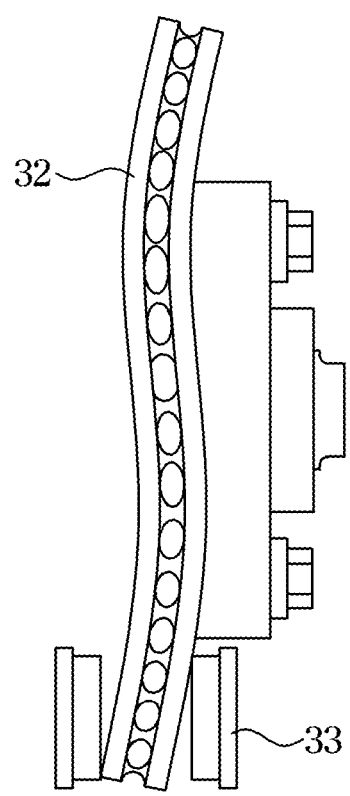
FIG. 2A and FIG. 2B are diagrams illustrating examples of a disc brake of a vehicle according to an exemplary embodiment of the present disclosure.
Figure 2B:
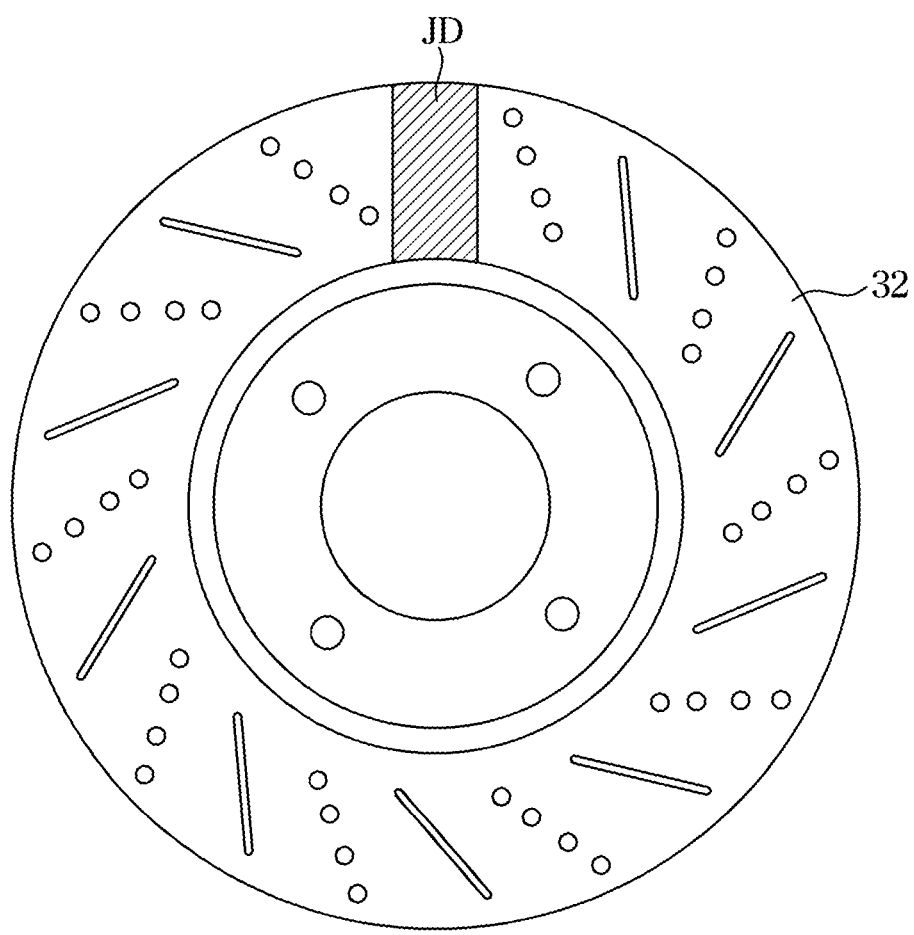

As shown in FIG. 2A and FIG. 2B, the disc brake may include a disc 32 (also referred to as 'disc wheel') rotating together with a wheel hub, a pad 33 which is close contact with the disc 32 to generate frictional force, a piston to which hydraulic pressure acts, and a caliper on which a piston is provided.

In the disc brake, when the piston is pushed using hydraulic pressure, the pad 33 is brought into close contact with the disc 32. In the present instance, braking force is generated through friction between the pad 33 and the disc 32.

Here, the hydraulic pressure may be hydraulic pressure transmitted through a brake booster and a master cylinder.

The brake booster boosts the force applied when the brake pedal is depressed, by use of a negative intake manifold pressure. The brake booster may increase braking force while allowing the user to put less force on the brake pedal.

The master cylinder converts the force applied to the brake pedal into brake fluid pressure.

Judder JD may occur in the disc of the disc brake.

Types of judder occurring on the disc include cold judder caused by disc thickness variation (DTV) and runout, and hot judder produced in a heat spot due to a rapid temperature rise of the disc during braking. The judder causes vibration and noise. Accordingly, a judder position where judder occurs and a judder intensity are required to be identified.

A judder identification device configured for identifying judder of a disc is described with reference to FIG. 3 and FIG. 4.

Figure 3:
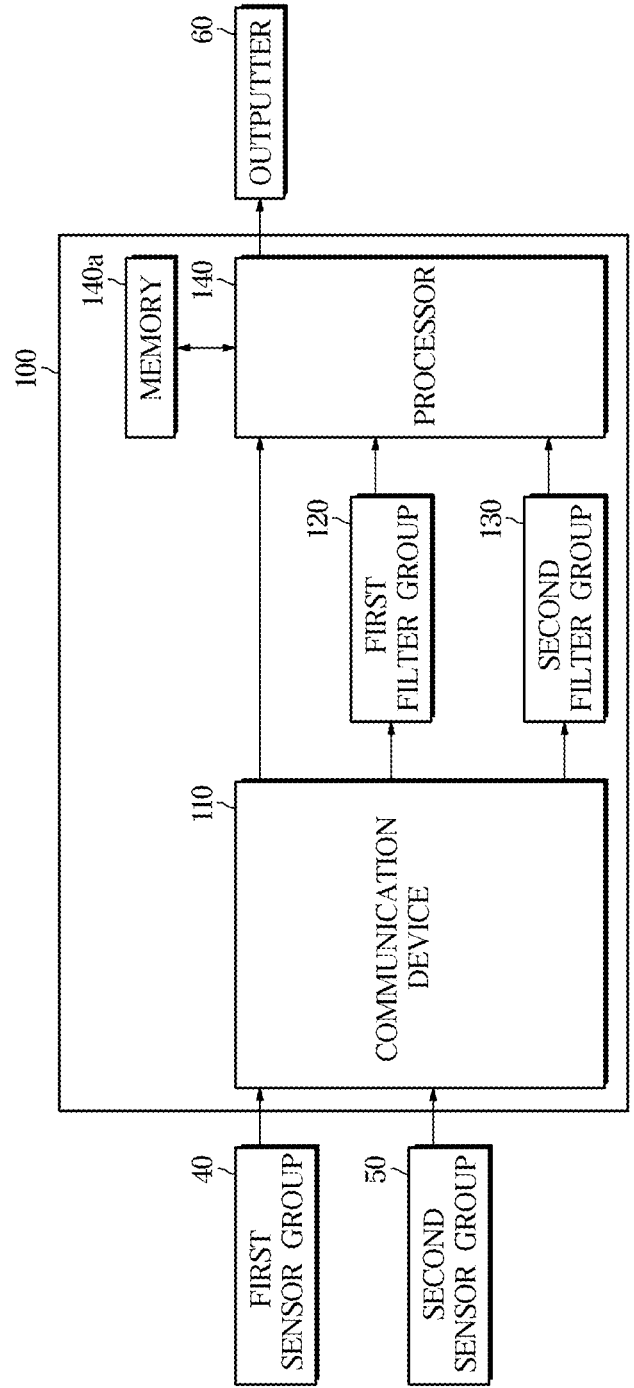
FIG. 3 is a block diagram illustrating a configuration of a vehicle provided with a judder identification device according to an exemplary embodiment of the present disclosure.

FIG. 3 is a block diagram illustrating a configuration of a vehicle provided with a judder identification device according to an exemplary embodiment of the present disclosure. FIG. 4 is a block diagram illustrating a detailed configuration of the judder identification device of FIG. 3.

As shown in FIG. 3, the vehicle 1 may include a first sensor group 40, a second sensor group 50, an outputter 60 and a judder identification device 100.

The first sensor group 40 may include sensors configured for identifying a judder position and a judder intensity.

The first sensor group 40 may include a steering angle sensor, a longitudinal acceleration sensor, a lateral acceleration sensor, a yaw rate sensor, a master cylinder pressure sensor, a steering input torque sensor, a steering output torque sensor, a throttle position sensor, a first wheel speed sensor configured for detecting a wheel speed of a front left wheel, a second wheel speed sensor configured for detecting a wheel speed of a front right wheel, and a brake pressure sensor configured for detecting a pedal force applied to a brake pedal. Here, the first wheel speed sensor is provided in the front left wheel and the second wheel speed sensor is provided in the front right wheel.

The steering angle sensor is configured to detect a steering speed, a steering direction and an angular speed of the steering wheel 21 to obtain a steering angle of the vehicle. That is, the steering angle sensor may include an angular speed sensor.

Steering angle information (swaIn_norm) may be obtained based on the steering speed, the steering direction and the angular speed detected by the steering angle sensor.

For example, the steering angle sensor is an optical device, and when steering, light of an optical element passes or is blocked while a slit plate of the sensor rotates, resulting in a change in voltage, which is received by a controller. Accordingly, the steering speed, the steering direction and the steering angle of the steering wheel may be obtained.

The steering angle sensor is mounted below the steering wheel 21, and may be mounted on a steering column of steering device or be provided on a pinion shaft of a pinion gear of the steering device.

The longitudinal acceleration sensor is configured to detect a longitudinal acceleration of the vehicle, and transmits longitudinal acceleration information (axin_nrom) about the detected longitudinal acceleration to the judder identification device 100.

The lateral acceleration sensor is configured to detect a lateral acceleration of the vehicle, and transmits lateral acceleration information (ayln_nrom) about the detected lateral acceleration to the judder identification device 100.

For example, the lateral acceleration sensor may include two piezo-electric sensors.

A weight loaded by a spring is hung on a measurement cell of the lateral acceleration sensor. The weight (=mass) is accelerated by arbitrary acceleration applied to or generated in a vehicle body. A force required for the above is generated by a mechanical tension of piezo-electric material. As a result, electric charge may change. Electrodes are used to detect the change in charge, and the change in charge is detected as lateral acceleration information.

The longitudinal acceleration sensor and the lateral acceleration sensor may be implemented as a single acceleration sensor.

The single acceleration sensor may be a sensor configured for detecting 3-axis acceleration or 6-axis acceleration.

The single acceleration sensor may be provided below a center console, inside a bonnet or dashboard to detect impact applied to a front of the vehicle, or be provided in front left and right doors, in left and right B pillars, in a tailgate or rear panel, or rear left and right doors.

The yaw rate sensor is a sensor fora yaw angular velocity or yaw moment, and may detect the yaw angular velocity at which a rotation angle (yaw angle) changes around a vertical line passing through a center portion of the vehicle, and transmit yaw rate information (yrin_norm) about the detected yaw angular velocity to the judder identification device 100.

The yaw rate sensor may be provided in the vehicle body of the vehicle 1, below the center console, in a driver's seat, and the like, without being limited thereto.

For example, when the vehicle rotates around a vertical axis, i.e., when the vehicle rotates around a z-axis, the yaw rate sensor electronically detects a yaw moment of the vehicle by vibration change of plate fork inside the yaw rate sensor. The yaw rate sensor includes a cerium crystal element, and includes a structure in which the element rotates and generates voltage when the vehicle moves and rotates.

The master cylinder pressure sensor may detect pressure generated inside a master cylinder during braking, and transmit master cylinder pressure information (prMCIn_norm) about the detected pressure to the judder identification device 100.

The steering input torque sensor is configured to detect a steering torque of the steering wheel or torque of a steering motor.

The steering input torque sensor may detect the steering torque generated in the steering wheel 21 as a steering input torque, and transmit steering input torque information (tqMdpsDrvIn_norm) about the detected steering input torque to the judder identification device 100.

The steering device may operate the steering motor based on the steering input torque generated by operation of the steering wheel 21. In the present instance, a motor torque may be generated by operation of the steering motor. The motor torque is transmitted to a belt through a pulley.

The pulley may be rotated by the motor torque. In the present instance, rotation force of the pulley may be transmitted to the belt.

The steering input torque may be torque input to the steering motor. The steering input torque sensor may detect the torque input to the steering motor.

The steering input torque may be input torque for controlling the steering motor. In the instant case, the steering input torque may be obtained based on a current applied to a motor corresponding to the input torque.

The steering output torque sensor may detect torque generated in the steering motor operated by the steering input torque, and transmit steering output torque information (tqMdpsOutIn_norm) about the detected torque to the judder identification device 100.

The throttle position sensor may detect an opening amount of a throttle valve in response to a depressed accelerator pedal, and transmit opening amount information (posGasIn_norm) about the detected opening amount to the judder identification device 100. In the present instance, the vehicle may inject fuel in an amount corresponding to the opening amount of the throttle valve.

The first wheel speed sensor is provided in a front left wheel, detects the wheel speed of the front left wheel, and transmits first wheel speed information (yWhlInFL_norm) about the detected wheel speed of the front left wheel to the judder identification device 100.

The second wheel speed sensor is provided in a front right wheel, detects the wheel speed of the front right wheel, and transmits second wheel speed information (yWhlInFR_norm) about the detected wheel speed of the front right wheel to the judder identification device 100.

For example, each of the first and second wheel speed sensors is provided adjacent to each of the front wheels, and may include a Hall sensor, a signal processor and a magnet.

Here, each of the front wheels is provided to interlock with a brake disc, and includes a plurality of teeth protruding on an external circumferential surface at regular intervals.

The first and second wheel speed sensors detect the teeth provided on each of the wheels by use of a magnetic flux of the magnet. In the present instance, the first wheel speed information and the second wheel speed information may be obtained based on the number of detected teeth of each of the wheels.

The brake pressure sensor may detect a pedal force applied to the brake pedal 31, and transmit pedal force information related to the detected pedal force to the judder identification device 100. Here, the pedal force information is for determining whether a user's braking intention exists.

The brake pressure sensor may include any one of a force sensor configured for detecting applied force, a pressure sensor configured for detecting applied pressure, a stroke sensor or a position sensor configured for detecting a position of the brake pedal.

The vehicle may further include a brake switch having an open contact, and the brake switch may be turned on or off based on the pedal force information of the vehicle.

The brake switch outputs turn-off information (Bls_ohe_0) to turn off a brake lamp when the brake pedal is released, and outputs turn-on information (Bls_ohe_1) to turn on the brake lamp when the brake pedal is depressed.

The brake switch may transmit the turn-off information and the turn-on information corresponding to a user's braking intention to the judder identification device 100.

The second sensor group 50 may include sensors for only obtaining information required for identifying a judder position.

The second sensor group 50 may include a third wheel speed sensor and a fourth wheel speed sensor. Here, the third wheel speed sensor is provided in a rear left wheel, detects a wheel speed of the rear left wheel, and transmits third wheel speed information (vWhlInRL_norm) about the detected wheel speed of the rear left wheel to the judder identification device 100, and the fourth wheel speed sensor is provided in a rear right wheel, detects a wheel speed of the rear right wheel, and transmits fourth wheel speed information (vWhlInRR_norm) about the detected wheel speed of the rear right wheel to the judder identification device 100.

For example, each of the third and fourth wheel speed sensors is provided close to each of the rear wheels, and may include a Hall sensor, a signal processor and a magnet.

Here, each of the rear wheels is provided to interlock with a brake disc, and includes a plurality of teeth protruding on an external circumferential surface at regular intervals.

The third and fourth wheel speed sensors detect the teeth provided on each of the wheels by use of a magnetic flux of the magnet. In the present instance, the third wheel speed information and the fourth wheel speed information may be obtained based on the number of detected teeth of each of the wheels.

The outputter 60 may receive judder information of the disc identified by the judder identification device 100, and output the received judder information of the disc.

The judder information of the disc may include a position where judder occurs (judder position) and a judder intensity.

The judder position may be at least one of a disc of the front left wheel or a disc of the front right wheel.

The outputter 60 may be a display provided on a head unit, or a speaker provided inside the vehicle.

The outputter 60 may an audio, video, navigation (AVN) device provided inside the vehicle.

The judder identification device 100 may obtain driving speed information of the vehicle based on the first, second, third, and fourth wheel speed information.

The judder identification device 100 may obtain the driving speed information of the vehicle based on longitudinal acceleration information.

The judder identification device 100 may obtain the driving speed information of the vehicle based on the longitudinal acceleration information and the first, second, third, and fourth wheel speed information.

The judder identification device 100 may identify a position (judder position) where judder occurs based on information of the sensors of the first sensor group and information of the sensors of the second sensor group. Here, the judder position may be at least one of the front left wheel or the front right wheel.

The judder identification device 100 may identify the judder position based on steering angle information, longitudinal acceleration information, lateral acceleration information, yaw rate information, master cylinder pressure information, steering input torque information, steering output torque information, throttle position information, the first wheel speed information, the second wheel speed information, the third wheel speed information, the fourth wheel speed information, and the driving speed information.

The judder identification device 100 may identify the judder intensity based on the information of the sensors of the first sensor group.

The judder identification device 100 may identify the judder intensity based on the steering angle information, the longitudinal acceleration information, the lateral acceleration information, the yaw rate information, the master cylinder pressure information, the steering input torque information, the steering output torque information, the throttle position information, the first wheel speed information, the second wheel speed information, and the driving speed information.

The judder identification device 100 includes a communication device 110, a first filter group 120, a second filter group 130 and a processor 140.

The communication device 110 may include at least one constituent component facilitating communication between an external device and the constituent components of the vehicle 1, for example, at least one of a short-range communication module, wireless communication module, or a wired communication module.

The short-range communication module may include a variety of short-range communication modules that transmit and receive signals in a short distance using a wireless communication network, such as a Bluetooth module, infrared communication module, radio frequency identification (RFID) communication module, wireless local access network (WLAN) communication module, near-field communication (NFC) communication module, Zigbee communication module, and the like.

The wired communication module may include various wired communication modules such as a Controller Area Network (CAN) communication module, local area network (LAN) module, wide area network (WAN) module, value added network (VAN) module, or the like, and also include various cable communication modules such as a universal serial bus (USB), high definition multimedia interface (HDMI), digital visual interface (DVI), recommended standard 232 (RS-232), power line communication, plain old telephone service (POTS), or the like.

The wired communication module may further include a Local Interconnect Network (LIN).

The wireless communication module may include wireless communication modules that support a variety of wireless communication methods such as a Global System for Mobile communication (GSM), Code Division Multiple Access (CDMA), wideb and CDMA (WCDMA), Universal Mobile Telecommunications System (UMTS), Time Division Multiple Access (TDMA), Long Term Evolution (LTE), and the like, in addition to a Wifi module and a Wibro module.

The communication device 110 may include a position receiver for identifying a current position of the vehicle.

The communication device 110 may communicate with the plurality of sensors of the first sensor group and the plurality of sensors of the second sensor group.

The communication device 110 may receive information detected by the plurality of sensors of the first sensor group and information detected by the plurality of sensors of the second sensor group.

The first filter group 120 may include a plurality of high pass filters 121 connected to each of a portion of sensors of the plurality of sensors of the first sensor group, and a plurality of low pass filters 122 connected to each of the other sensors of the plurality of sensors of the first sensor group.

The portion of sensors described above may include the steering input torque sensor, the first wheel speed sensor and the second wheel speed sensor.

Each of the high pass filters 121 of the first filter group 120 passes a preset high-frequency signal among signals of the steering input torque sensor, a preset high-frequency signal among signals of the first wheel speed sensor, and a preset high-frequency signal among signals of the second wheel speed sensor.

Here, the preset high-frequencies may vary for each high pass filter, or be identical to each other.

The signals passing through the plurality of high pass filters of the first filter group may be transmitted to a first processor 141.

The other sensors include the lateral acceleration sensor, the yaw rate sensor, and the master cylinder pressure sensor.

Each of the low pass filters 122 of the first filter group passes a preset low-frequency signal among signals of the lateral acceleration sensor, a preset low-frequency signal among signals of the yaw rate sensor, and a preset low-frequency signal among signals of the master cylinder pressure sensor.

Here, the preset low-frequencies may vary for each low pass filter, or be identical to each other.

The signals passing through the plurality of low pass filters of the first filter group may be transmitted to the first processor 141.

The second filter group 130 may include a plurality of high pass filters 131 connected to each of the sensors of the second sensor group.

The plurality of sensors of the second sensor group may include the third wheel speed sensor and the fourth wheel speed sensor.

Each of the high pass filters 131 passes a preset high-frequency signal among signals of the third wheel speed sensor, and a preset high-frequency signal among signals of the fourth wheel speed sensor.

Here, the preset high-frequencies may vary for each high pass filter, or be identical to each other.

The signals passing through the plurality of high pass filters of the second filter group may be transmitted to a second processor 142.

The processor 140 may recognize the driving speed information of the vehicle based on the first, second, third and fourth wheel speed information of the plurality of wheel speed sensors.

Here, the driving speed information of the vehicle may be speed information related to a longitudinal direction of the vehicle.

The processor 140 may also recognize the driving speed information of the vehicle based on the longitudinal acceleration information of the longitudinal acceleration sensor.

The processor 140 may also recognize the driving speed information of the vehicle based on the longitudinal acceleration information and the first, second, third and fourth wheel speed information.

The processor 140 may also recognize the driving speed information of the vehicle based on signals from a plurality of global positioning system (GPS) satellites received in the position receiver of the communication device.

The processor 140 may receive pedal force information detected by the brake pressure sensor, and identify pressure or force applied to the brake pedal 31 based on the received pedal force information.

The processor 140 may identify a position or stroke of the brake pedal 31 based on the received pedal force information.

The processor 140 may identify whether a user's braking intention exists based on the received pedal force information.

The processor 140 may receive turn-on information from the brake switch, when the brake switch is turned on in response to the received pedal force information. When the brake switch is turned off in response to the received pedal force information, the processor 140 may receive turn-off information from the brake switch.

The vehicle may turn on a brake lamp in response to the brake switch being turned on, and turn off the brake lamp in response to the brake switch being turned off.

The processor 140 may identify whether a user's acceleration intention exists based on the opening amount information detected by the throttle position sensor.

When it is determined that the vehicle is braked, the processor 140 recognizes the driving speed information and the turn-on information and turn-off information of the brake switch, receives the information detected by the plurality of sensors of the first sensor group, and receives first filtering information and second filtering information filtered through the first filter group 120. Accordingly, the processor 140 predicts a judder intensity based on the recognized driving speed information, the recognized turn-on information and turn-off information, the received information, and the received first filtering information and second filtering information.

When it is determined that the vehicle is braked, the processor 140 recognizes the driving speed information and the turn-on information and turn-off information of the brake switch, receives the information detected by the plurality of sensors of the first sensor group and the second sensor group, and receives third filtering information and fourth filtering information filtered through the second filter group 130. Accordingly, the processor 140 predicts a judder position based on the recognized driving speed information, the recognized turn-on information and turn-off information, the received information, the received third filtering information and fourth filtering information.

The processor 140 identifies a judder position and a judder intensity based on the predicted judder intensity, a preset judder intensity, the predicted judder position, and a preset judder position, and transmits the identified judder position and judder intensity to the outputter 60.

The processor 140 may include a first artificial intelligence (AI) model performing first deep learning for predicting a judder intensity, and a second AI model performing second deep learning for predicting a judder position.

The processor 140 may be implemented as a memory 140*a* that stores an algorithm for controlling operations of constituent components of the judder identification device or data about a program that reproduces the algorithm, and a processor that is configured to perform the above-described operations using the data stored in the memory 140*a*. In the present instance, the memory 140*a* and the processor 140 may be provided as one chip, or provided as separate chips.

The memory 140a may store a program and/or data for the processor 140 to generate a braking signal and/or a steering signal.

AI-related functions are operated through the processor 140 and the memory.

The processor 140 may be a single processor or a plurality of processors. In the present instance, the single or the plurality of processors 140 may be a processor such as a central processing unit (CPU), an application processor (AP), a digital signal processor (DSP), and the like, a graphics-only processor such as a graphics processing unit (GPU) and a vision processing unit (VPU), or an AI-dedicated processor such as a neural network processing unit (NPU).

The single or the plurality of processors 140 control input data to be processed according to predetermined operating rules or AI models stored in the memory.

Alternatively, when the single or the plurality of processors 140 are the AI-dedicated processor, the AI-dedicated processor may be designed with a hardware structure specialized for processing a specific AI model.

The predetermined operating rules or AI models are characterized by being made through learning. Here, being made through learning refers to that the predetermined operating rules or AI models set to perform a desired feature (alternatively, a desired objective) are generated by training a basic AI model using a large amount of training data by a learning algorithm.

Such training may be performed in a device itself where the AI model is performed, or through a separate server and/or system.

For example, the learning algorithm may include a supervised learning, unsupervised learning, semi-supervised learning, or reinforcement learning, without being limited thereto.

Deep learning may be a type of AI developed from artificial neural networks. That is, deep learning may be performed based on artificial neural networks. In deep learning, information to be used for classification may be self-learned.

The AI model may include a plurality of neural network layers.

Each of the neural network layers includes a plurality of weight values, and is configured to perform a neural network computation through a computation result of a previous layer and computation among the plurality of weight values.

The plurality of weight values of the plurality of neural network layers may be optimized by a learning result of the AI model. For example, the plurality of weight values may be updated so that a loss value or a cost value obtained from the AI model is reduced or minimized during a learning process.

The artificial neural network may be a deep neural network (DNN), a convolutional neural network (CNN), a recurrent neural network (RNN), a restricted Boltzmann machine (RBM), deep belief network (DBN), bidirectional recurrent deep neural network (BRDNN), deep Q-Networks, or the like, without being limited thereto.

At least one constituent component may be added or omitted corresponding to the performance of the constituent components of the vehicle 1 illustrated in FIG. 3. Also, it will be easily understood by those skilled in the art that mutual positions of the constituent components may be modified corresponding to the performance or structure of the system.

Each of the constituent components shown in FIG. 3 refers to a software, and/or a hardware component such as a field-programmable gate array (FPGA) or an application-specific integrated circuit (ASIC).

In the exemplary embodiment of the present disclosure, the processor 140 may be configured to process input information (also referred to as input data) by use of an AI model including artificial neural networks of the convolutional neural network.

Figure 4:
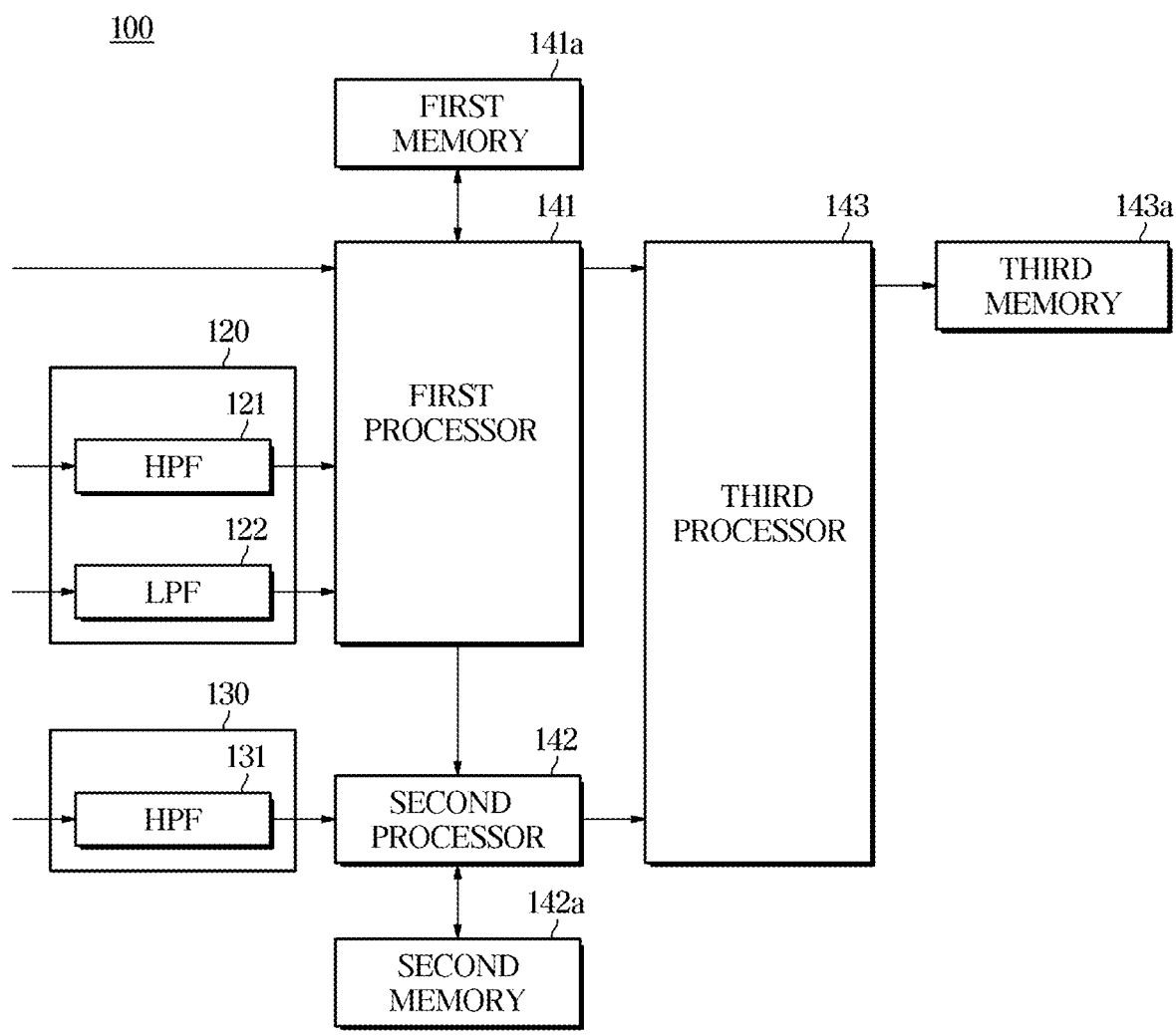
FIG. 4 is a block diagram illustrating a detailed configuration of the judder identification device of FIG. 3.

As shown in FIG. 4, the processor 140 may include the first processor 141 configured for predicting a judder intensity, the second processor 142 configured for predicting a judder position, and a third processor 143 configured for identifying a judder intensity and a judder position based on the judder intensity and the judder position predicted by the first processor 141 and the second processor 142, respectively. Configurations of the first, second, and third processors are described with reference to FIG. 5 and FIG. 6.

Figure 5:
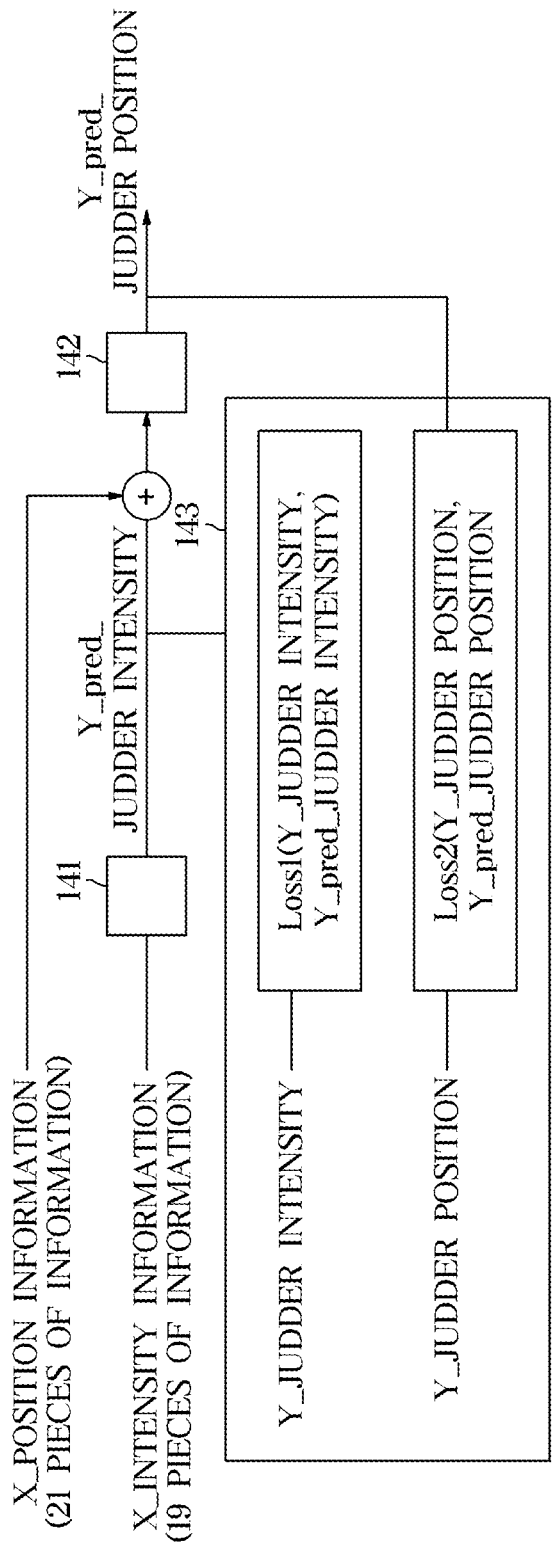
FIG. 5 is a diagram illustrating a configuration of a learning model of first, second, and third processors of the judder identification device of FIG. 4.

FIG. 5 is a diagram illustrating a configuration of a learning model of first, second, and third processors, and FIG. 6 is a diagram illustrating judder intensity levels for predicting a judder intensity and judder position levels for predicting a judder position.

The first processor 141 receives information detected by a plurality of sensors through the communication device 110, and receives first filtering information and second filtering information filtered through the first filter group.

The information of the plurality of sensors received through the communication device 110 may include steering angle information, longitudinal acceleration information, lateral acceleration information, yaw rate information, master cylinder pressure information, steering input torque information, steering output torque information, throttle position information, first wheel speed information, second wheel speed information, driving speed information, and turn-on information and turn-off information of a brake switch.

The first filtering information may include filtering information of steering input torque, filtering information of a first wheel speed, and filtering information of a second wheel speed.

The second filtering information may include filtering information of lateral acceleration, filtering information of yaw rate, and filtering information of master cylinder pressure.

As shown in FIG. 5, the first processor 141 may train the AI model by performing CNN-based deep learning based on the steering angle information, the longitudinal acceleration information, the lateral acceleration information, the yaw rate information, the master cylinder pressure information, the steering input torque information, the steering output torque information, the throttle position information, the first wheel speed information, the second wheel speed information, the driving speed information, the turn-on information and the turn-off information of the brake switch, the filtering information of the steering input torque, the filtering information of the first wheel speed, the filtering information of the second wheel speed, the filtering information of the lateral acceleration, the filtering information of the yaw rate, and the filtering information of the master cylinder pressure. Accordingly, the first processor 141 may be configured to predict a judder intensity through AI model training.

The first processor 141 may include a first AI model AI1 performing CNN-based deep learning.

The first processor 141 may be configured to predict the judder intensity in predetermined levels.

As shown in FIG. 6, the preset levels may be set by a magnitude of intensity. The preset levels may be set to a total six levels.

The first processor 141 may obtain a first training error (Loss1) based on a difference between the predicted judder intensity and a preset judder intensity.

The first memory 141a may store preset judder intensity information corresponding to the steering angle information, the longitudinal acceleration information, the lateral acceleration information, the yaw rate information, the master cylinder pressure information, the steering input torque information, the steering output torque information, the throttle position information, the first wheel speed information, the second wheel speed information, the driving speed information, the turn-on information and the turn-off information of the brake switch, the filtering information of the steering input torque, the filtering information of the first wheel speed, the filtering information of the second wheel speed, the filtering information of the lateral acceleration, the filtering information of the yaw rate, and the filtering information of the master cylinder pressure.

The preset judder intensity information may vary depending on the information detected and filtered by the plurality of sensors, i.e., the steering angle information, the longitudinal acceleration information, the lateral acceleration information, the yaw rate information, the master cylinder pressure information, the steering input torque information, the steering output torque information, the throttle position information, the first wheel speed information, the second wheel speed information, the driving speed information, the turn-on information and the turn-off information of the brake switch, the filtering information of the steering input torque, the filtering information of the first wheel speed, the filtering information of the second wheel speed, the filtering information of the lateral acceleration, the filtering information of the yaw rate, and the filtering information of the master cylinder pressure.

The first memory 141a may store the preset judder intensity information corresponding to the information detected and filtered by the plurality of sensors, as a table.

The first memory 141a may store a program and/or data for the first processor 141 to generate judder intensity prediction information.

The first memory 141a may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a Hard Disk Drive (HDD), or a compact disc read only memory (CD-ROM), without being limited thereto.

In an exemplary embodiment of the present disclosure, the first memory 141a and the first processor 141 may be integrated into one chip, or provided as separate chips.

The second processor 142 receives third filtering information and fourth filtering information filtered through the second filter group.

The third filtering information may include filtering information of a third wheel speed.

The fourth filtering information may include filtering information of a fourth wheel speed.

As shown in FIG. 5, the second processor 142 may train the AI model by performing CNN-based deep learning based on the judder intensity predicted by the first processor 141, the filtering information of the third wheel speed and the filtering information of the fourth wheel speed. Accordingly, the second processor 142 may be configured to predict a judder position through AI model training.

The second processor 142 may include a second AI model AI2 performing CNN-based deep learning.

The second processor 142 may be configured to predict the judder intensity in preset levels.

As shown in FIG. 6, the preset levels may be set by a judder position. The preset levels may be set to a total five levels.

The second processor 142 may obtain a second training error (Loss2) based on a difference between the predicted judder position and a preset judder position.

A second memory 142a may store preset judder position information corresponding to the predicted judder intensity, the filtering information of the third wheel speed and the filtering information of the fourth wheel speed.

The preset judder position information may vary depending on preset judder position information corresponding to the predicted judder intensity, the filtering information of the third wheel speed and the filtering information of the fourth wheel speed.

The second memory 142a may store the preset judder position information corresponding to the predicted judder intensity, the third filtering information and the fourth filtering information, as a table.

The second memory 142a may store a program and/or data for the second memory 142a to generate judder position prediction information.

The second memory 142a may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a Hard Disk Drive (HDD), or a compact disc read only memory (CD-ROM), without being limited thereto.

In an exemplary embodiment of the present disclosure, the second memory 142a and the second processor 142 may be integrated into one chip, or provided as separate chips.

The third processor 143 may identify a judder position and a judder intensity based on the first training error and the second training error.

The third processor 143 may identify the judder position and the judder intensity based on a total training error (Total Loss) obtained by combining the first training error (Loss1) and the second training error (Loss2).

The third processor 143 may update deep learning of the first and second processors to minimize the total training error (Total Loss).

That is, the first and second processors may perform CNN-based deep learning so that the total training error obtained by combining the first training error and the second training error is minimized.

When obtaining the total training error (Total Loss), the third processor 143 utilizes a human tuning value a.

Total Loss=α*Loss1+(1−α)*Loss2

The human tuning value used when obtaining the total training error (Total Loss) may be set by confirming a value that produces an optimal result when different human tuning values a are input multiple times. The optimal result may be a value that the total training error is minimized.

A third memory 143a may store a program and/or data for the third processor 143 to generate judder position information and judder intensity information.

The third memory 143a may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a Hard Disk Drive (HDD), or a compact disc read only memory (CD-ROM), without being limited thereto.

In an exemplary embodiment of the present disclosure, the third memory 143*a* and the third processor 143 may be integrated into one chip, or provided as separate chips.

At least one constituent component may be added or omitted corresponding to the performance of the constituent components of the judder identification device 100 illustrated in FIG. 4. Also, it will be easily understood by those skilled in the art that mutual positions of the constituent components may be modified corresponding to the performance or structure of the system.

Each of the constituent components shown in FIG. 4 refers to a software, and/or a hardware component such as a field-programmable gate array (FPGA) or an application-specific integrated circuit (ASIC).

The first processor 141 and the second processor 142 train the AI model by performing CNN-based deep learning.

A concept of convolutional neural network (CNN) is described with reference to FIG. 7A, FIG. 7B, FIG. 7C and FIG. 7D.

Figure 7A:
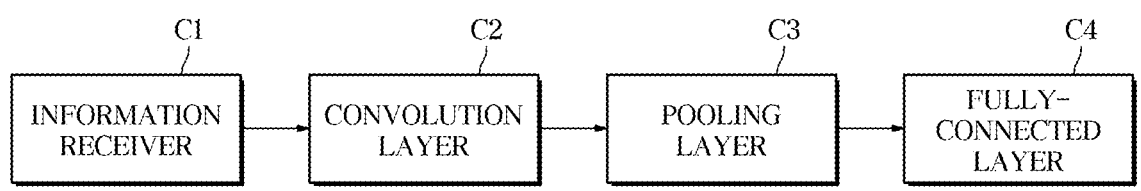
FIG. 7A, FIG. 7B, FIG. 7C and FIG. 7D are diagrams illustrating a concept of a convolutional neural network (CNN) of a judder identification device according to an exemplary embodiment of the present disclosure.

As shown in FIG. 7A, the CNN may include an information receiver c1, a convolution layer C2, a pooling layer C3 and a fully-connected layer C4.

The information receiver C1 receives information detected by a plurality of sensors, first filtering information, second filtering information, third filtering information, and fourth filtering information.

The information receiver C1 may receive only information required to identify a judder position and a judder intensity by performing deep learning through the CNN.

Figure 7B:
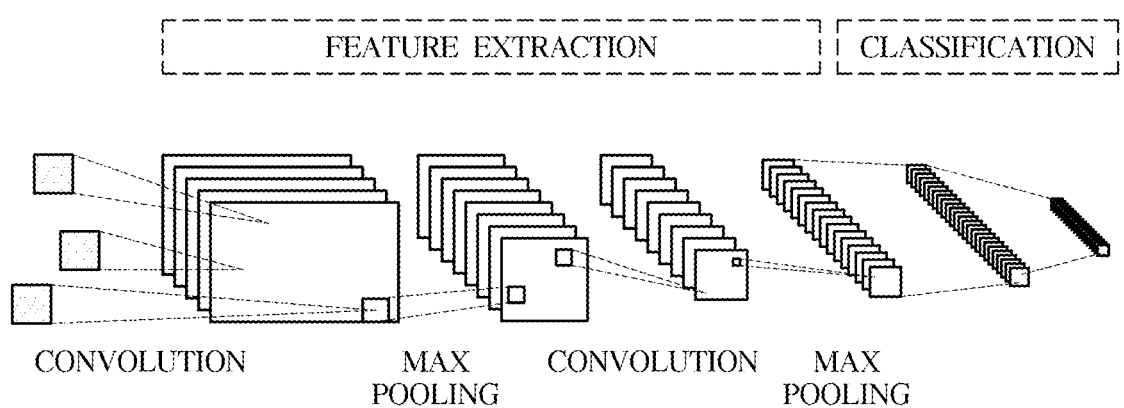

As shown in FIG. 7B, the convolution layer C2 and the pooling layer C3 may include a structure in which stacks are repeatedly layered, and include feature extraction extracting features from information of the plurality of sensors.

The convolution layer C2 extracts feature information related to the received information.

The convolution layer C2 may include a filter configured for extracting feature information from data corresponding to each piece of information, and an activation function that changes a value of the filter to a non-linear value.

The filter may be a function for detecting whether a signal corresponding to a feature exists in the received information. The filter may be defined as a square matrix such as (2,2), (3, 3), (4, 4) or (5, 5).

The filter outputs a large result value when feature information exists in data corresponding to the received information, and when no feature information exists or no similar feature information exists, outputs a value close to 0.

Figure 7C:
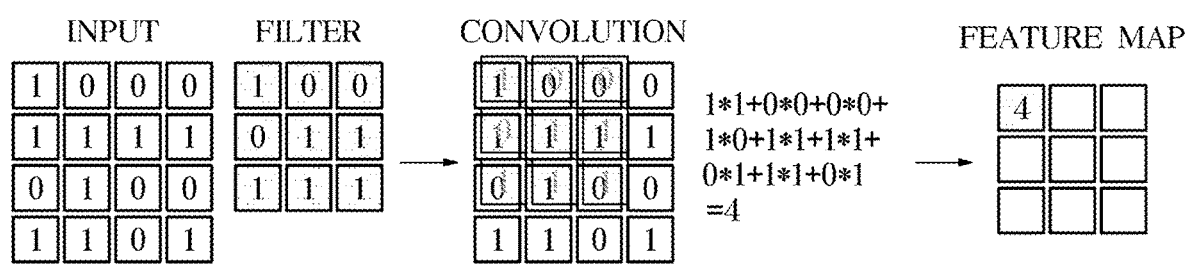

As shown in FIG. 7C, when 5×5 data exists, the convolution layer C2 moves 3×3 filter from top left to the left by one space, and then moves to the left by one space in the next row to extract feature information. In the present instance, pixel values where the 3×3 filter is located are multiplied.

Accordingly, the convolution layer C2 may obtain a feature map by applying the filter to data. Here, the feature map is referred to as an activation map.

A size of the feature map may be determined based on a size of data, a size of filter, and a size of stride. Here, the stride may also be the number of rows and columns that the filter moves.

The convolution layer C2 may pass only information corresponding to a feature of each piece of data.

The pooling layer C3 is configured to perform an operation of reducing the extracted feature map. Pooling of the pooling layer includes max pooling, average pooling, and L2-norm pooling.

The pooling layer C3 of the exemplary embodiment is configured to perform an operation of reducing the extracted feature map by use of max pooling.

Max pooling is to cut a feature map into a size M×N, and then select a maximum value in the cut feature map.

Figure 7D:
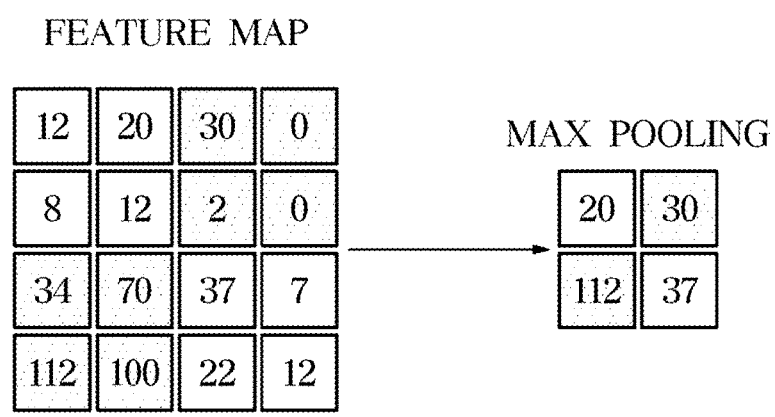

As shown in FIG. 7D, the pooling layer C3 obtains max pooling by moving a 2×2 max pooling filter by two spaces with a stride of 2 in a 4×4 feature map and selecting a maximum value.

The pooling layer C3 receives output data of the convolution layer as input thereof and reduces data size of the feature map or emphasizes specific data. Through the above, the size of the entire data may be reduced, and determining resources required for computation may be reduced.

The convolution layer C2 may find a feature of an image while minimizing the number of data by use of the filter, and the pooling layer C3 may enhance and collect features.

The fully connected layer C4 may include a hidden layer including approximately 1024 neurons and an output layer.

The fully connected layer C4 is configured to perform classification on a received signal by applying the feature information to the neural network, and outputs information related to the judder position identification and judder intensity identification in response to the classification. For example, the fully connected layer C4 may convert the feature information into a predetermined value using a softmax function. A sum of the converted values becomes 1, and a highest value becomes a target of classification.

Accordingly, the judder identification device may identify the judder position and the judder intensity by performing CNN-based deep learning on the received information.

The above-described judder position identification and judder intensity identification may be performed at preset periods.

AI models performing CNN-based deep learning in the first processor and the second processor are described with reference to FIG. 8, FIG. 9, FIG. 10, FIG. 11, FIG. 12, FIG. 13, FIG. 14 and FIG. 15.

Figure 8:
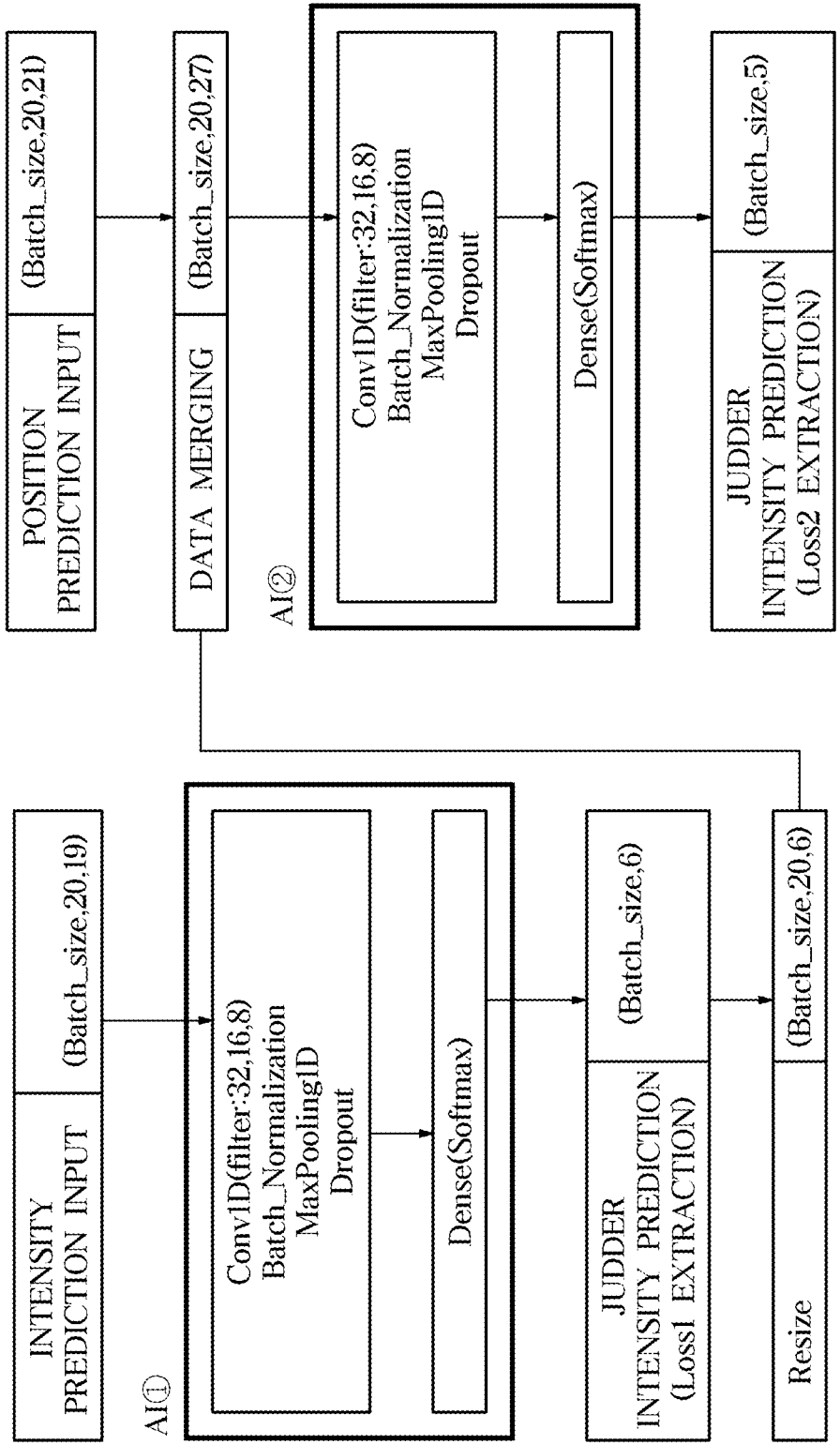

As shown in FIG. 8, the first processor of the judder identification device may receive information for predicting a judder intensity as input thereof. The first processor may receive input information for predicting a judder intensity during a preset time period, at preset periods.

The preset time period may be approximately 0.2 seconds, and the preset period may be approximately 0.01 second.

The first processor may receive 19 pieces of input information 20 times, and generate the 19 pieces of input information received 20 times as a matrix.

When it is assumed that a batch size (Batch_size) is two, as shown in FIG. 9, the first processor may obtain first batch data and second batch data at preset time intervals. The preset time interval may be 0.01 second as one period.

For example, the first batch data includes 19 pieces of information at intervals of 0.01 second, from 0.01 to 0.20 seconds. The second batch data includes 19 pieces of information at intervals of 0.01 second, from 0.02 to 0.21 seconds.

The first processor is configured to perform CNN-based deep learning.

Figure 10A:
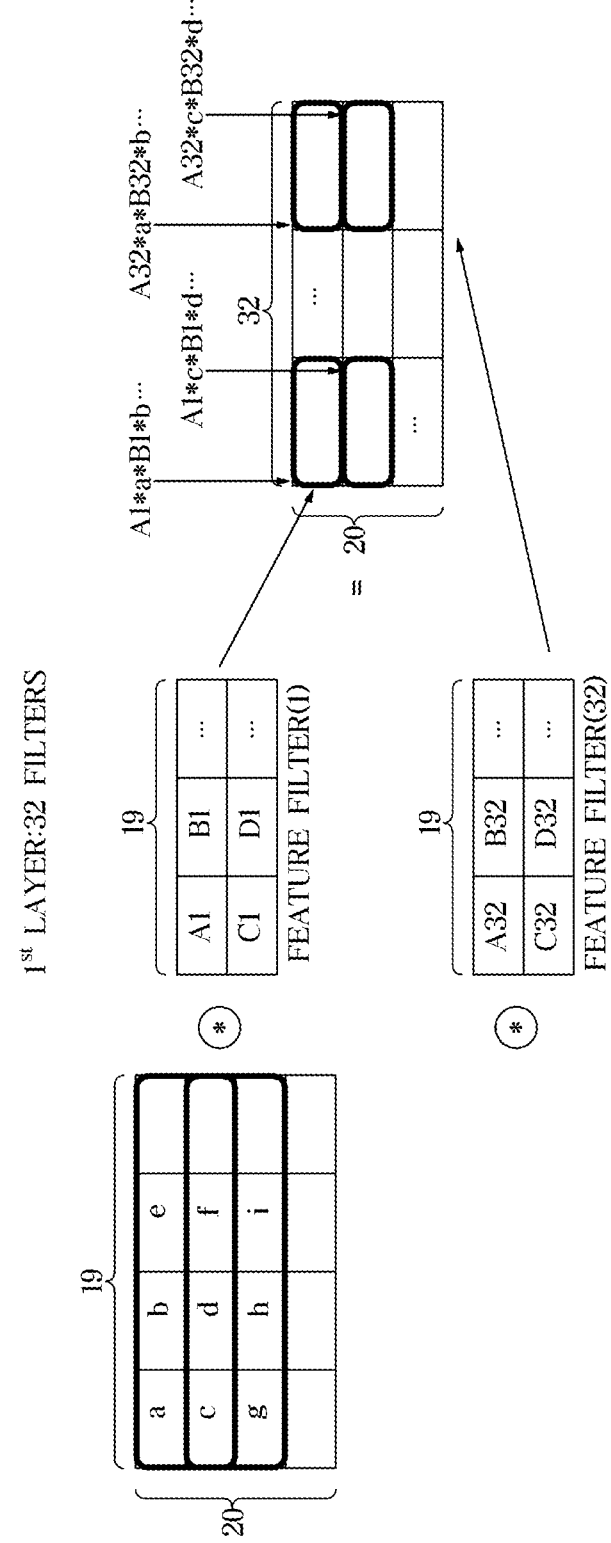

As shown in FIG. 10A, a first matrix including 32 pieces of information may be obtained for each of the 20 times through convolution product of the first batch data and the first layer $1^{st}$.

The first layer may have 32 feature filters.

Figure 10B:
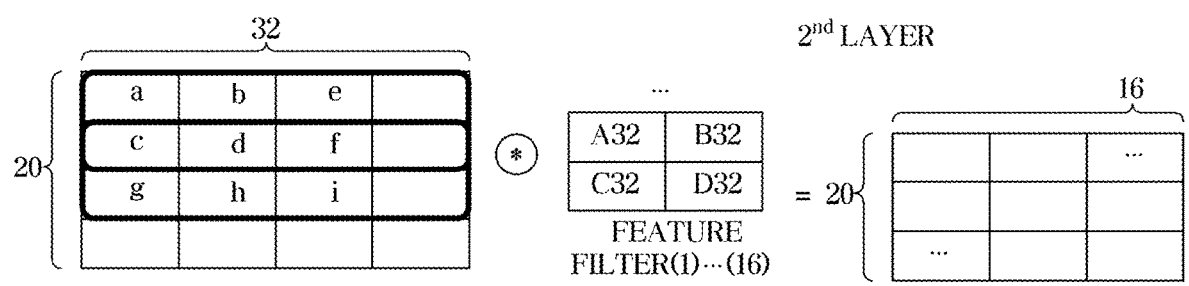

As shown in FIG. 10B, a second matrix including 16 pieces of information may be obtained for each of the 20 times through convolution product of the first matrix and the second layer $2^{nd}$.

The second layer may have 16 feature filters.

Figure 10C:
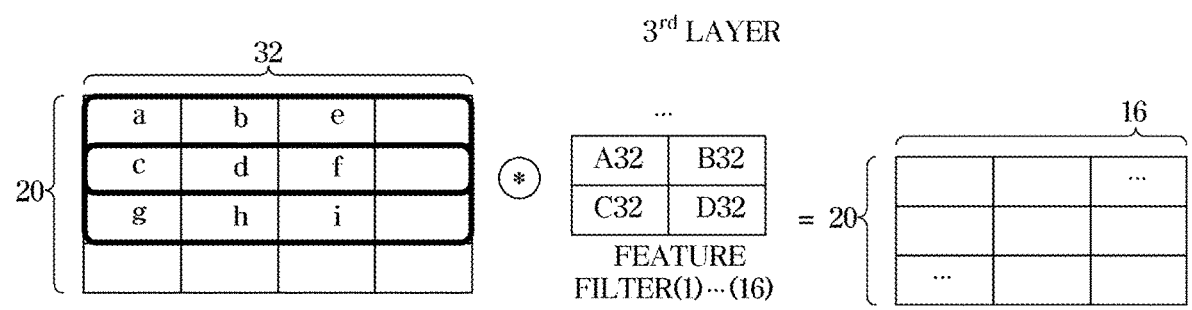

As shown in FIG. 10C, a third matrix including 8 pieces of information may be obtained for each of the 20 times through convolution product of the first batch data and the third layer $3^{rd}$.

The third layer may have 8 feature filters.

For the second batch data, a third matrix including 8 pieces of information may be obtained for each of the 20 times through convolution product of a plurality of layers.

The first processor may obtain the third matrix of the first batch data and the third matrix of the second batch data as an output result matrix. Here, the output result matrix is a feature map and may be a matrix of [2, 20, 8].

The first processor is configured to perform normalization through the CNN.

The first processor may set a coefficient value (γ, β), optimally normalized for each batch for the output result matrix, to be obtained through learning.

Figure 11:
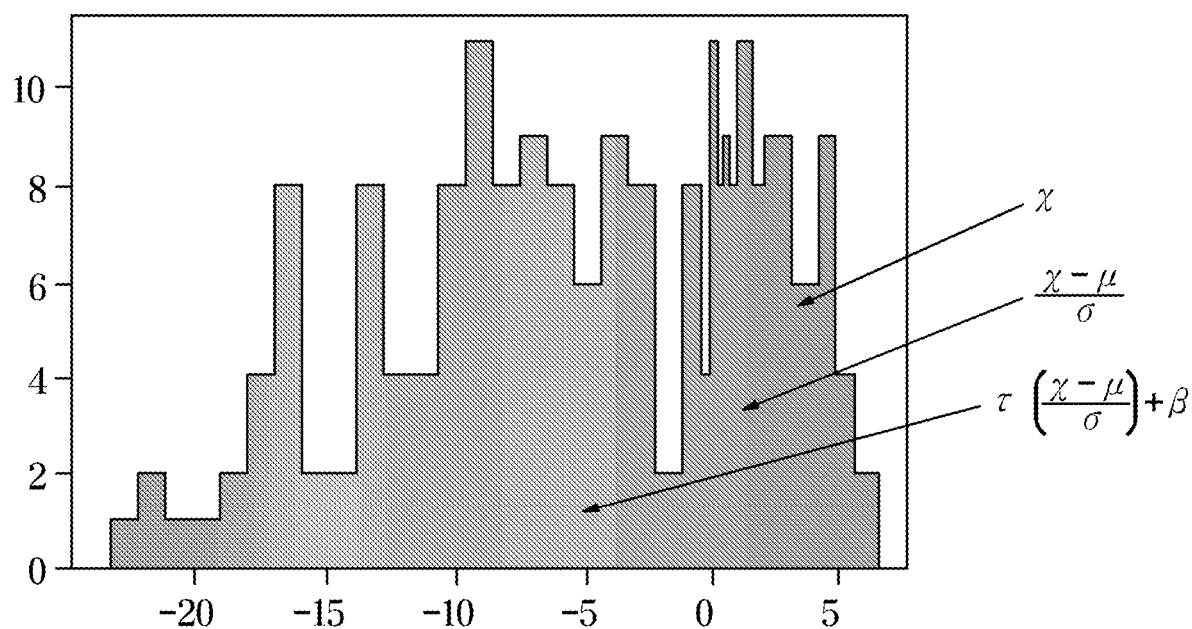

As shown in FIG. 11, when the output result matrix is original data x, the first processor is configured to perform normalization on the original data through Equation 1 below.

$$(x-\mu)/\sigma \quad \text{[Equation 1]}$$

The first processor is configured to obtain the coefficient value (γ, β) optimally normalized for each batch through Equation 2 below.

$$\gamma((x-\mu)/\sigma)+\beta \quad \text{[Equation 2]}$$

γ (scale) denotes an adjustment of a width of distribution
β (shift or bias) denotes an adjustment of a center of distribution
μ: average, σ: distribution The first processor may also obtain the coefficient value (γ, β) optimally normalized for each batch through Equation 3 below.

$$\gamma((x-\mu/(\sigma+\epsilon))+\beta \quad \text{[Equation 3]}$$

Figure 12:
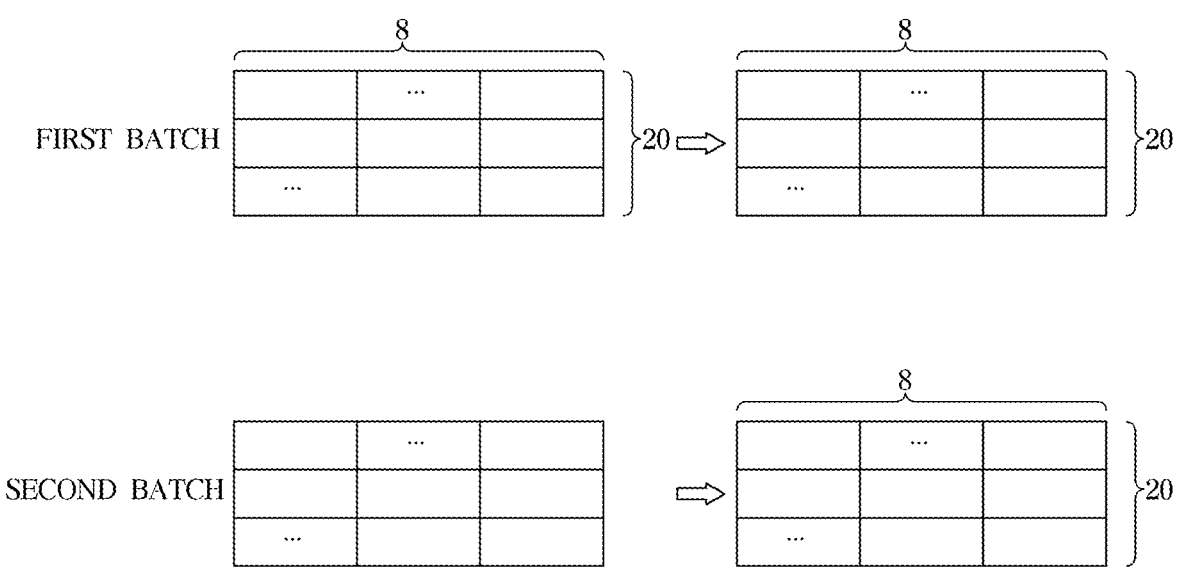

As shown in FIG. 12, the first processor may obtain normalized data for each of the data of the output result matrix, and change the data in the output result matrix into the obtained normalized data.

The first processor may change to the optimally normalized data for each of the first batch and the second batch.

Figure 13:
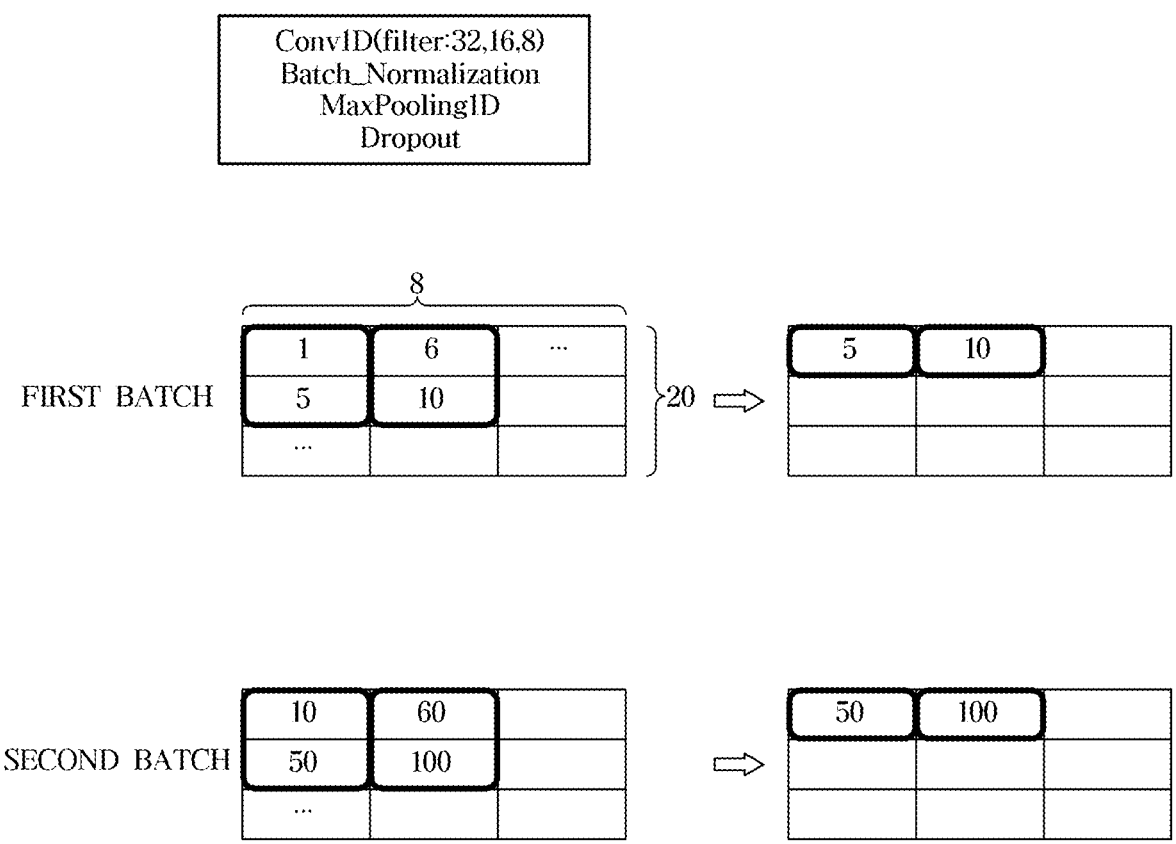

As shown in FIG. 13, the first processor extracts a maximum value (max) from the normalized data of the first batch through max pooling. The first processor extracts a maximum value (max) from the normalized data of the second batch through max pooling.

Max pooling is to cut a feature map into a size M×N, and then select a maximum value in the cut feature map.

Figures 14A, 14B:
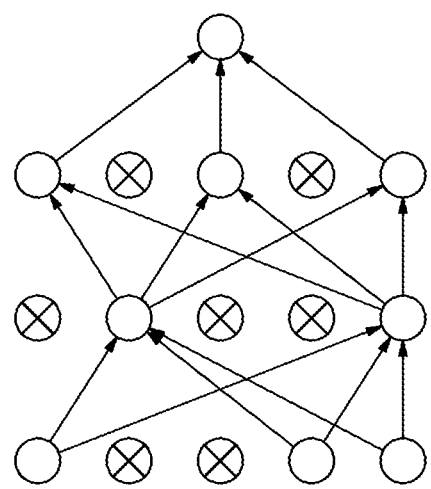

As shown in FIGS. 14A and 14B, the first processor randomly deactivating a portion of neural network nodes each time learning is performed by applying dropout, improving accuracy of learning. The first processor may train all nodes and computational connection models to achieve optimal performance at a latter portion of learning.

The first processor may not operate for the hidden layer by applying drop out.

The first processor is configured to obtain a result value (a result value of AI) for each level of judder intensity throughout dropout. In the present instance, the first processor may change the result value for each level of the judder intensity into a form of a final output size.

The first processor may obtain result values for each of the six judder intensity levels.

The first processor may change the result value into a probability value (0 to 1) using a softmax function.

$$P_j(x) = \frac{e^{x_j}}{\sum_{k=1}^{N} e^{x_k}}$$

x: AI result value
N: 6 (output of six levels)
P: probability value of 0 to 1 processed by softmax
j and k are integer numbers.

For example, when the probability values for the six judder intensity levels are 0.1, 0.01, 0.005, 0.8, 0.2, and 0.1, the first processor may change the highest value among the six probability values to 1, and change the remaining values to 0, i.e., the probability values may be changed to 0 0 0 1 0 0.

Referring to FIG. 15, the first processor confirms a judder intensity level including '0 0 0 1 0 0' as a correct value. The first processor is configured to predict the judder intensity level as the third level.

The first processor is configured to predict the judder intensity as any one of the six levels, at every period based on CNN. The first processor is configured to predict a judder intensity level with respect to each of the 20 times.

The first processor is configured to transmit the judder intensity level predicted with respect to each of the 20 times to the second processor 142.

As shown in FIG. 8, the second processor 142 of the judder identification device may receive information for predicting a judder position as input thereof. The second processor 142 may receive the information for predicting a judder position during a preset time period, at preset periods.

The preset time period may be approximately 0.2 seconds, and the preset period may be approximately 0.01 second.

The second processor 142 may receive 21 pieces of information 20 times.

The second processor 142 may merge the judder intensity level with respect to each of the 20 times received from the first processor (six levels in total) and the 21 pieces of information with respect to each of the 20 times.

The second processor 142 may obtain 27 pieces of information for each of the 20 times through the merging.

The second processor 142 may perform CNN-based deep learning.

Because the CNN-based deep learning performed by the second processor 142 is similar to that performed by the first processor, a description thereof is omitted.

The second processor 142 may obtain a result value for each of the five judder position levels.

The second processor 142 may change the result value into a probability value (0 to 1) using a softmax function.

For example, the second processor is configured to change the highest value among the five probability values to 1, and changes the remaining values to 0. The second processor confirms a judder position level by comparing the changed values and five correct answers.

The second processor 142 may be configured to predict the judder position as any one of the five levels, at every period based on CNN. The second processor is configured to predict a judder position level with respect to each of the 20 times.

As is apparent from the above, according to the exemplary embodiments of the present disclosure, a position of a wheel where judder occurs and a judder intensity may be identified through artificial intelligence and learning, improving an accuracy of identifying the position of the wheel where judder occurs and the judder intensity.

According to the exemplary embodiments of the present disclosure, a position of a wheel where judder occurs and a judder intensity may be identified, allowing only the wheel where judder occurs to be repaired. Accordingly, quality cost and repair cost may be reduced, and thus user's satisfaction may be improved.

That is, because the judder position and judder intensity may be identified, only the wheel where judder occurs may be replaced and wheel balancing for only the wheel where judder occurs may be performed. Accordingly, only the cost of replacing and balancing the wheel where judder occurs may be spent, reducing the cost caused by occurrence of judder.

According to the exemplary embodiments of the present disclosure, marketability and competitiveness of vehicle may be enhanced due to improved user convenience and reliability.

Meanwhile, embodiments may be stored in a form of a recording medium storing computer-executable instructions. The instructions may be stored in a form of a program code, and when executed by a processor, the instructions may perform operations of the disclosed exemplary embodiments of the present disclosure. The recording medium may be implemented as a computer-readable recording medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A judder identification apparatus, comprising:
   a communication apparatus configured to communicate with a first sensor group and a second sensor group;
   a first processor configured to predict a judder intensity based on information detected by a plurality of sensors of the first sensor group;
   a second processor configured to predict a judder position based on the information detected by the plurality of sensors of the first sensor group and information detected by a plurality of sensors of the second sensor group; and
   a third processor configured to identify a judder position and a judder intensity based on the judder intensity predicted by the first processor, a preset judder intensity, the judder position predicted by the second processor, and a preset judder position.

2. The judder identification apparatus of claim 1,
   wherein the plurality of sensors of the first sensor group includes a steering angle sensor, a longitudinal acceleration sensor, a lateral acceleration sensor, a yaw rate sensor, a master cylinder pressure sensor, a steering input torque sensor, a steering output torque sensor, a throttle position sensor, a first wheel speed sensor, a second wheel speed sensor, and a brake pressure sensor, and
   wherein the information detected by the plurality of sensors of the first sensor group includes steering angle information of the steering angle sensor, longitudinal acceleration information of the longitudinal acceleration sensor, lateral acceleration information of the lateral acceleration sensor, yaw rate information of the yaw rate sensor, pressure information of the master cylinder pressure sensor, input torque information of the steering input torque sensor, output torque information of the steering output torque sensor, opening amount information of the throttle position sensor, first wheel speed information of the first wheel speed sensor configured for detecting a wheel speed of a front left wheel, second wheel speed information of the second wheel speed sensor configured for detecting a wheel speed of a front right wheel, and pedal force information of a brake pedal from the brake pressure sensor.

3. The judder identification apparatus of claim 2, further including:
   a high pass filter configured to pass a preset high-frequency signal among signals of a portion of sensors of the plurality of sensors of the first sensor group; and
   a low pass filter configured to pass a preset low-frequency signal among signals of other sensors of the plurality of sensors of the first sensor group,
   wherein the first processor is configured to:
   when predicting the judder intensity, recognize first filtering information including a signal passing through the high pass filter, recognize second filtering information including a signal passing through the low pass filter, and predict the judder intensity based on the first filtering information and the second filtering information.

4. The judder identification apparatus of claim 3,
   wherein the signals of the portion of sensors of the plurality of sensors of the first sensor group include a signal from the steering input torque sensor and signals from the first wheel speed sensor and the second wheel speed sensor, and wherein the signals of the other sensors of the plurality of sensors of the first sensor group include a signal from the lateral acceleration sensor, a signal from the yaw rate sensor, and a signal from the master cylinder pressure sensor.

5. The judder identification apparatus of claim 2, wherein the first processor is configured to receive turn ON/OFF information from a brake switch turned on or off in response to a pedal force detected by the brake pressure sensor.

6. The judder identification apparatus of claim 1, further including:

a high pass filter configured to pass a preset high-frequency signal among signals of a third wheel speed sensor configured for detecting a wheel speed of a rear left wheel, and a preset high-frequency signal among signals of a fourth wheel speed sensor configured for detecting a wheel speed of a rear right wheel, the third wheel speed sensor and the fourth wheel speed sensor belonging to the plurality of sensors of the second sensor group, wherein the second processor is configured to:

when predicting the judder position, recognize third filtering information of the third wheel speed sensor and fourth filtering information of the fourth wheel speed sensor based on the signal passing through the high pass filter, and predict the judder position based on the recognized third filtering information and the recognized fourth filtering information.

7. The judder identification apparatus of claim 1, wherein the plurality of sensors of the first sensor group includes a first wheel speed sensor, a second wheel speed sensor, and a longitudinal acceleration sensor, and wherein the first processor is configured to recognize driving speed information based on at least one piece of information of first wheel speed information detected by the first wheel speed sensor, second wheel speed information detected by the second wheel speed sensor, or longitudinal acceleration information detected by the longitudinal acceleration sensor.

8. The judder identification apparatus of claim 1, wherein the first processor is configured to transmit the predicted judder intensity to the second processor.

9. The judder identification apparatus of claim 1, wherein the first processor includes a first artificial intelligence (AI) model performing convolutional neural network (CNN)-based deep learning, and wherein the second processor includes a second AI model performing the CNN-based deep learning.

10. The judder identification apparatus of claim 9, wherein the first AI model is configured to perform filter normalization, max-pooling, and dropout through the CNN-based deep learning, and predict one of six judder intensity levels using a soft max function, and wherein the second AI model is configured to perform filter normalization, max-pooling, and dropout through the CNN-based deep learning, and predict one of five judder position levels.

11. A vehicle, comprising:

a first sensor group including a plurality of sensors;

a second sensor group including a plurality of sensors different from the plurality of sensors of the first sensor group;

a processor configured to predict a judder intensity based on information detected by the plurality of sensors of the first sensor group, predict a judder position based on the information detected by the plurality of sensors of the first sensor group and information detected by the plurality of sensors of the second sensor group, and identify a judder position and a judder intensity based on the predicted judder intensity, a preset judder intensity, the predicted judder position, and a preset judder position; and an outputter configured to output the identified judder position and the identified judder intensity.

12. The vehicle of claim 11, wherein the plurality of sensors of the first sensor group include a steering angle sensor, a longitudinal acceleration sensor, a lateral acceleration sensor, a yaw rate sensor, a master cylinder pressure sensor, a steering input torque sensor, a steering output torque sensor, a throttle position sensor, a first wheel speed sensor configured for detecting a wheel speed of a front left wheel, a second wheel speed sensor configured for detecting a wheel speed of a front right wheel, and a brake pressure sensor configured for detecting a pedal force applied to a brake pedal.

13. The vehicle of claim 12, further including:

a high pass filter configured to pass a preset high-frequency signal among signals of a portion of sensors of the plurality of sensors of the first sensor group; and a low pass filter configured to pass a preset low-frequency signal among signals of other sensors of the plurality of sensors of the first sensor group, wherein the processor is configured to:

when predicting the judder intensity, recognize first filtering information including a signal passing through the high pass filter, recognize second filtering information including a signal passing through the low pass filter, and predict the judder intensity based on the first filtering information and the second filtering information.

14. The vehicle of claim 13, wherein the signals of the portion of sensors of the plurality of sensors of the first sensor group include a signal from the steering input torque sensor and signals from the first wheel speed sensor and the second wheel speed sensor, and wherein the signals of the other sensors of the plurality of sensors of the first sensor group include a signal from the lateral acceleration sensor, a signal from the yaw rate sensor, and a signal from the master cylinder pressure sensor.

15. The vehicle of claim 12, further including:

a brake switch configured to turn on or off a brake lamp, wherein the processor is configured to turn on or off the brake switch based on the pedal force detected by the brake pressure sensor.

16. The vehicle of claim 11, wherein the plurality of sensors of the second sensor group include a third wheel speed sensor configured for detecting a wheel speed of a rear left wheel and a fourth wheel speed sensor configured for detecting a wheel speed of a rear right wheel, wherein the vehicle further includes a high pass filter configured to pass a preset high-frequency signal among signals of the third wheel speed sensor and a preset high-frequency signal among signals of the fourth wheel speed sensor, and wherein the processor is further configured to, when predicting the judder position, recognize third filtering information of the third wheel speed sensor and fourth filtering information of the fourth wheel speed sensor based on the signal passing through the high pass filter, and predict the judder position based on the recognized third filtering information and the recognized fourth filtering information.

17. The vehicle of claim 11, wherein the processor is further configured to predict the judder position based on the predicted judder intensity and the information detected by the plurality of sensors of the second sensor group.

18. The vehicle of claim 11,
wherein the plurality of sensors of the first sensor group includes a first wheel speed sensor, a second wheel speed sensor, and a longitudinal acceleration sensor, and
wherein, when predicting the judder intensity, the processor is further configured to recognize driving speed information based on at least one piece of information of first wheel speed information detected by the first wheel speed sensor, second wheel speed information detected by the second wheel speed sensor, or longitudinal acceleration information of the longitudinal acceleration sensor, and predict the judder intensity based on the recognized driving speed information.

19. The vehicle of claim 11, wherein the processor includes a first AI model configured to predict the judder intensity by performing CNN-based deep learning, and a second AI model configured to predict the judder position by performing the CNN-based deep learning.

20. The vehicle of claim 19, wherein the processor is further configured to:
obtain an intensity training error based on a difference between the predicted judder intensity and the preset judder intensity,
obtain a position training error based on a difference between the predicted judder position and the preset judder position,
obtain a total training error based on the intensity training error, the position training error, and a human tuning value, and
update the first AI model and the second AI model to minimize the obtained total training error.

\* \* \* \* \*